United States Patent
Koblanski

[11] Patent Number: 5,397,460
[45] Date of Patent: Mar. 14, 1995

[54] SURFACE SEPARATOR AND DISPERSION APPARATUS

[75] Inventor: John Koblanski, Burnaby, Canada

[73] Assignee: Tech-Scan Technologies, Ltd, Burnaby, Canada

[21] Appl. No.: 66,045

[22] Filed: May 25, 1993

[51] Int. Cl.$^6$ ............................................. E02B 18/04
[52] U.S. Cl. ................................... 210/86; 210/104; 210/242.3; 210/923
[58] Field of Search ...................... 210/242.3, 258, 259, 210/923, 519, 532.1, 538, 540, 86, 104

[56] References Cited

U.S. PATENT DOCUMENTS

| | | | |
|---|---|---|---|
| 3,223,243 | 12/1965 | Muller | 210/242.3 |
| 3,753,496 | 8/1973 | Boyd | 210/923 |
| 3,794,175 | 2/1974 | Stewart | 210/242.3 |
| 3,800,951 | 4/1974 | Mourlon et al. | 210/923 |
| 3,853,767 | 12/1974 | Mohn | 210/242.3 |
| 4,046,691 | 9/1977 | Irons | 210/923 |
| 4,126,552 | 11/1978 | Middelbeck | 210/242.3 |
| 4,142,972 | 3/1979 | Nebeker et al. | 210/242.3 |
| 4,804,936 | 2/1989 | Sale | 338/80 |
| 5,108,600 | 4/1992 | Rees et al. | 210/242.3 |

FOREIGN PATENT DOCUMENTS

| | | |
|---|---|---|
| 84405 | 7/1983 | European Pat. Off. . |
| 2500431 | 2/1981 | France . |
| 2408792 | 9/1975 | Germany . |
| 2033773 | 5/1980 | United Kingdom . |

*Primary Examiner*—Christopher Upton
*Attorney, Agent, or Firm*—Townsend and Townsend Khourie and Crew

[57] ABSTRACT

An apparatus to separate two immiscible liquids of different densities that form a two phase mixture comprising an upper layer (10) and a lower layer (12) when together. The apparatus has a main body (14) to receive the two liquids. The main body has a base and an open top. There is an outlet (20) adjacent the base of the main body, arranged tangentially. A pump (22) pumps liquid from the main body through the outlet (20). A jet (24) generally adjacent the center of the main body (14) directs liquid upwardly from the body. The liquid is supplied to the jet (24) by pump (22). Floats (30) allow floating of the apparatus in a mixture of the two liquids. The fluid driven from the outlet (22) draws the two liquids into the body and the liquid from the jet (24) forces the upper layer (10) of liquid upwardly to separate the two liquids.

39 Claims, 18 Drawing Sheets

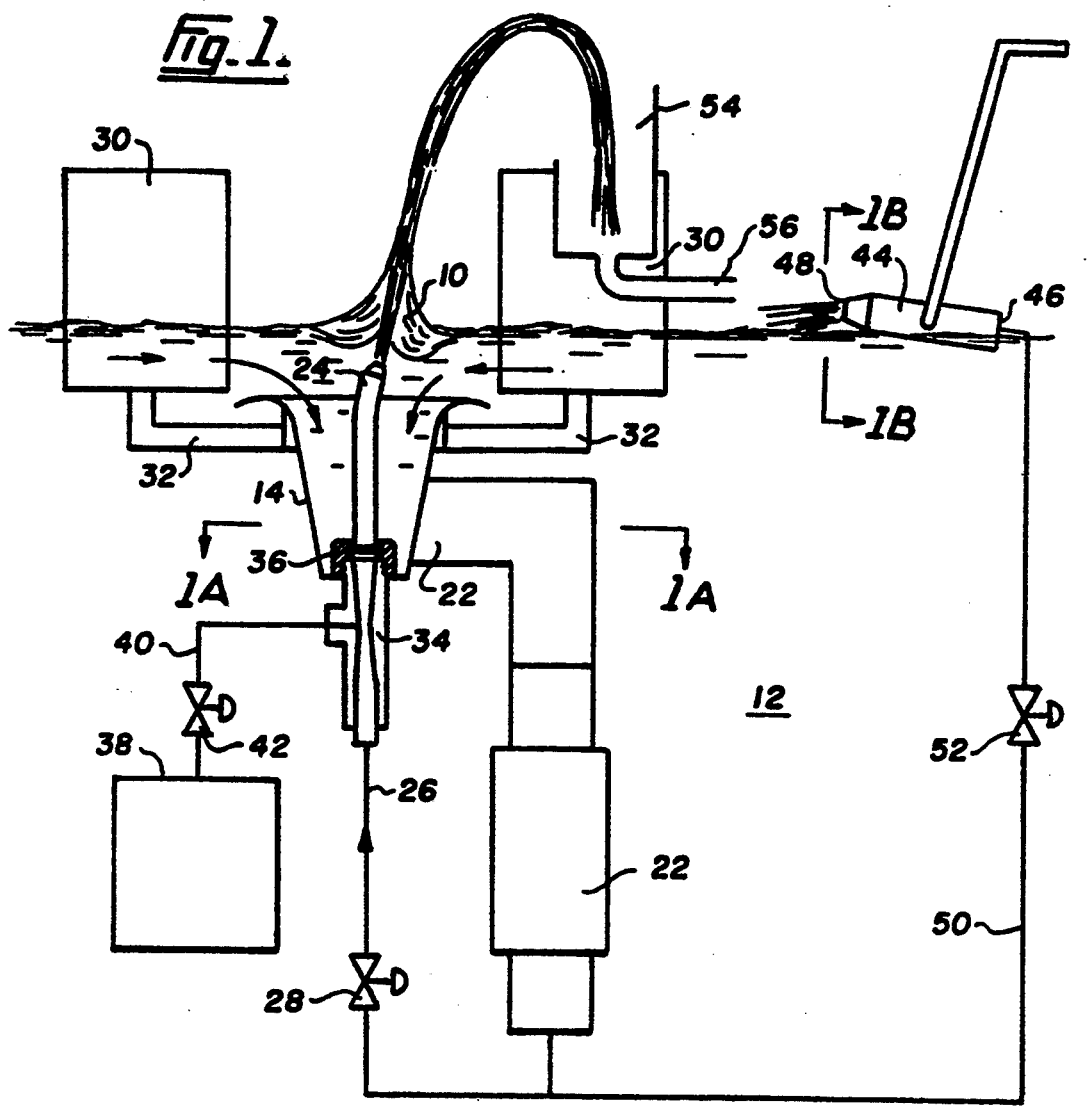
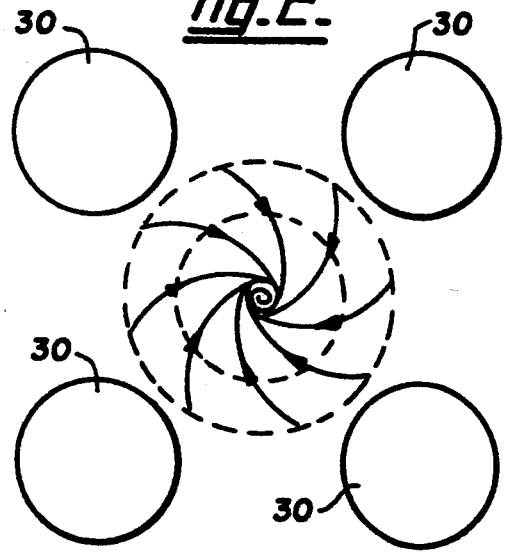
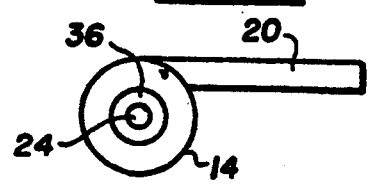

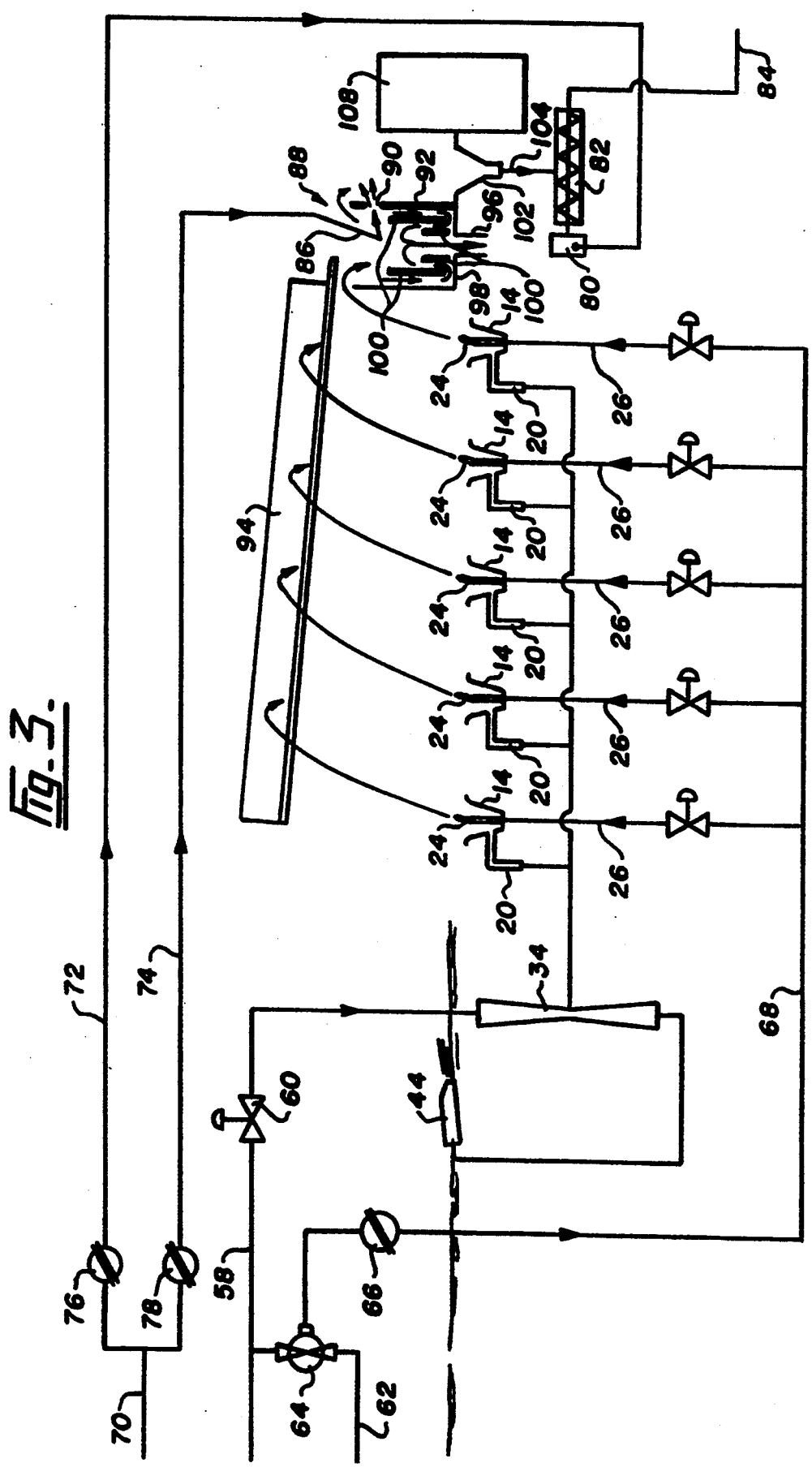

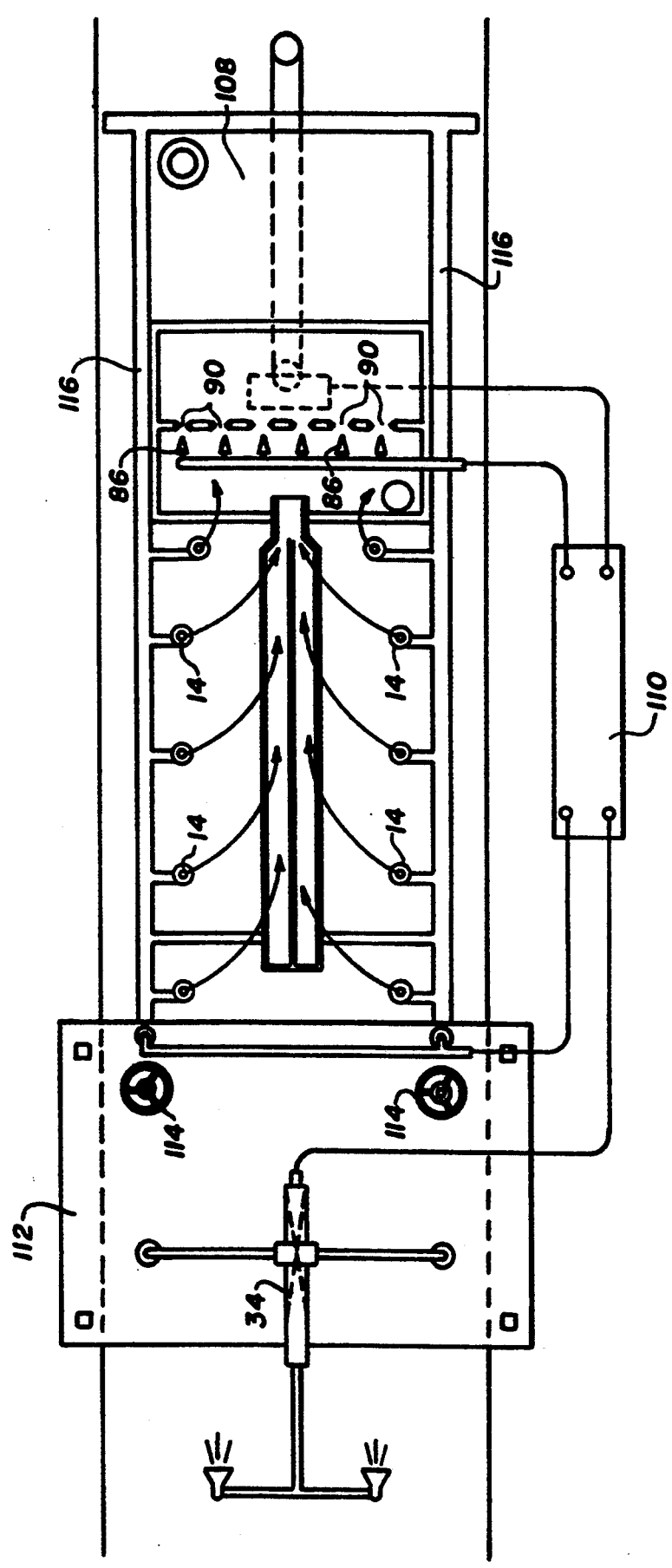

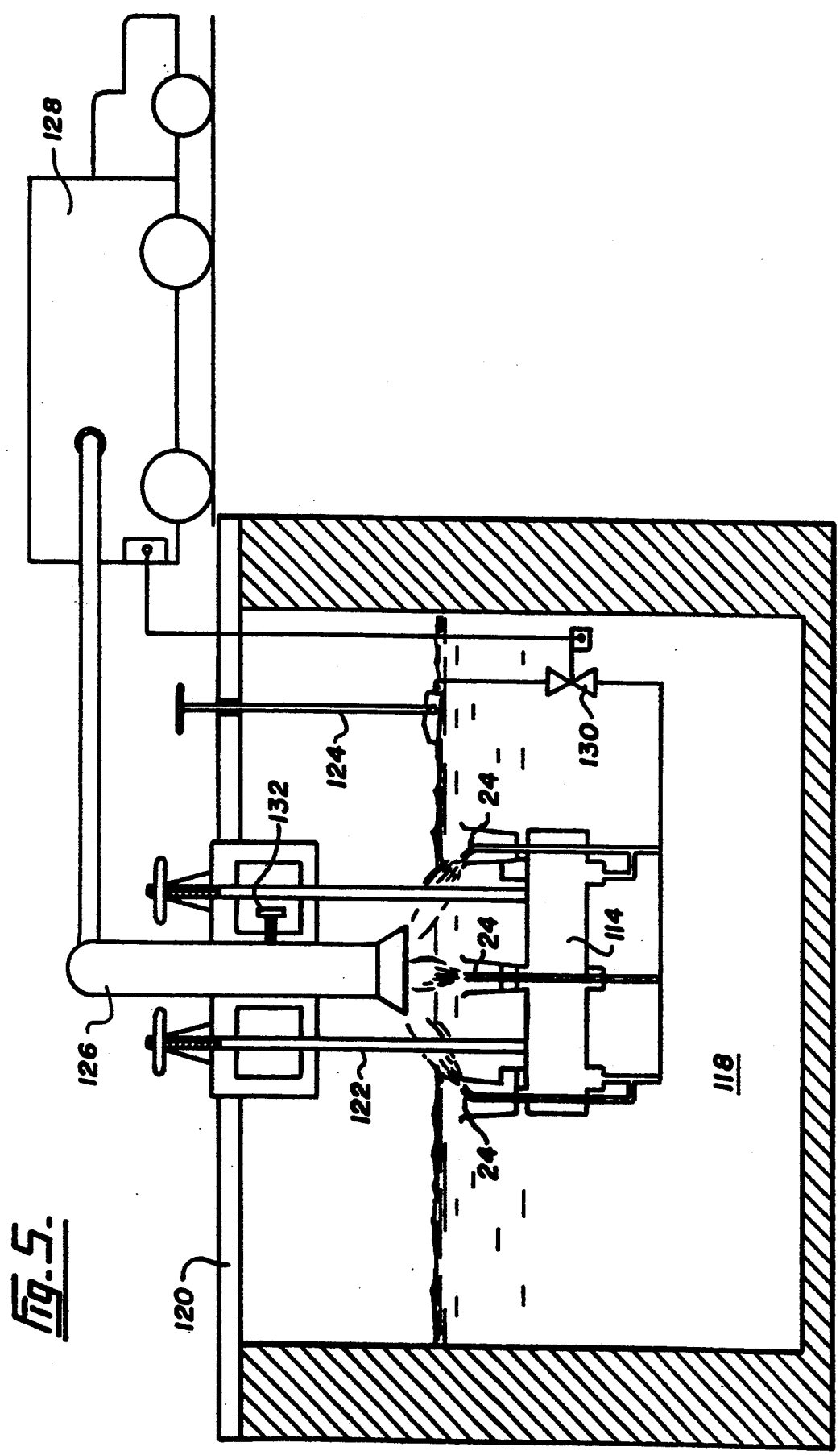

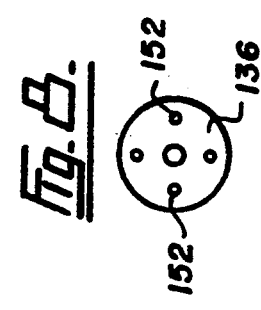
Fig. 8.
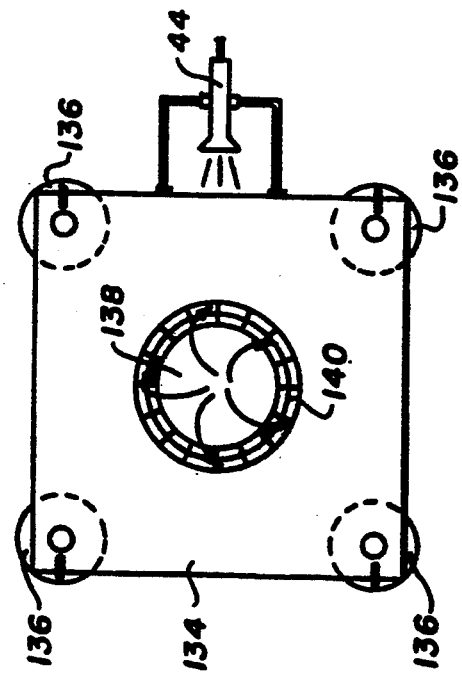
Fig. 7.
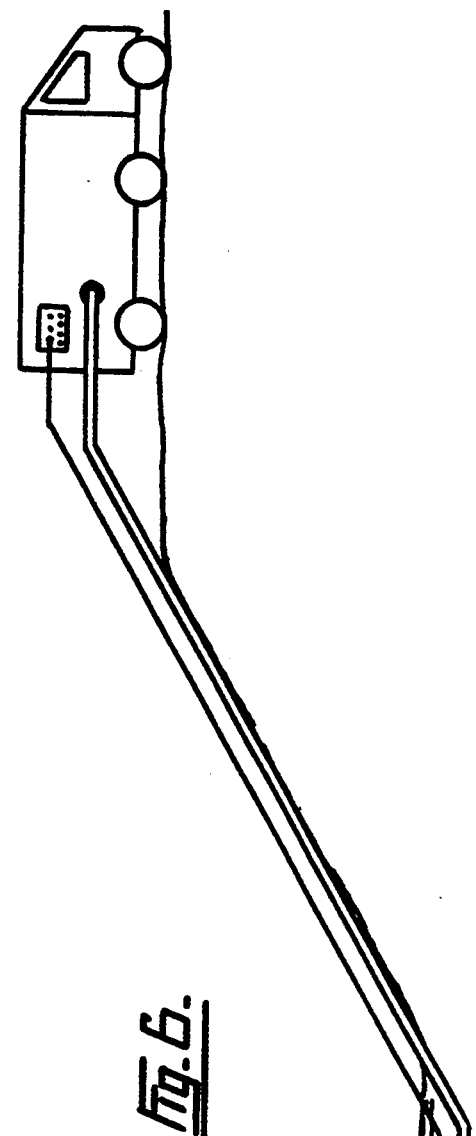
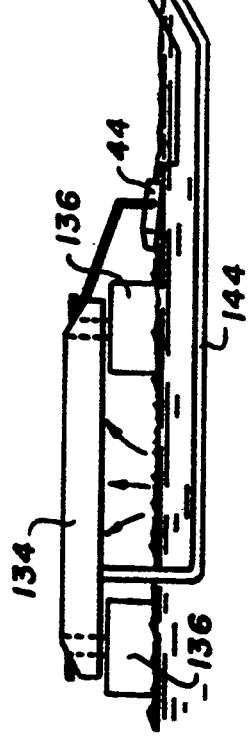
Fig. 6.

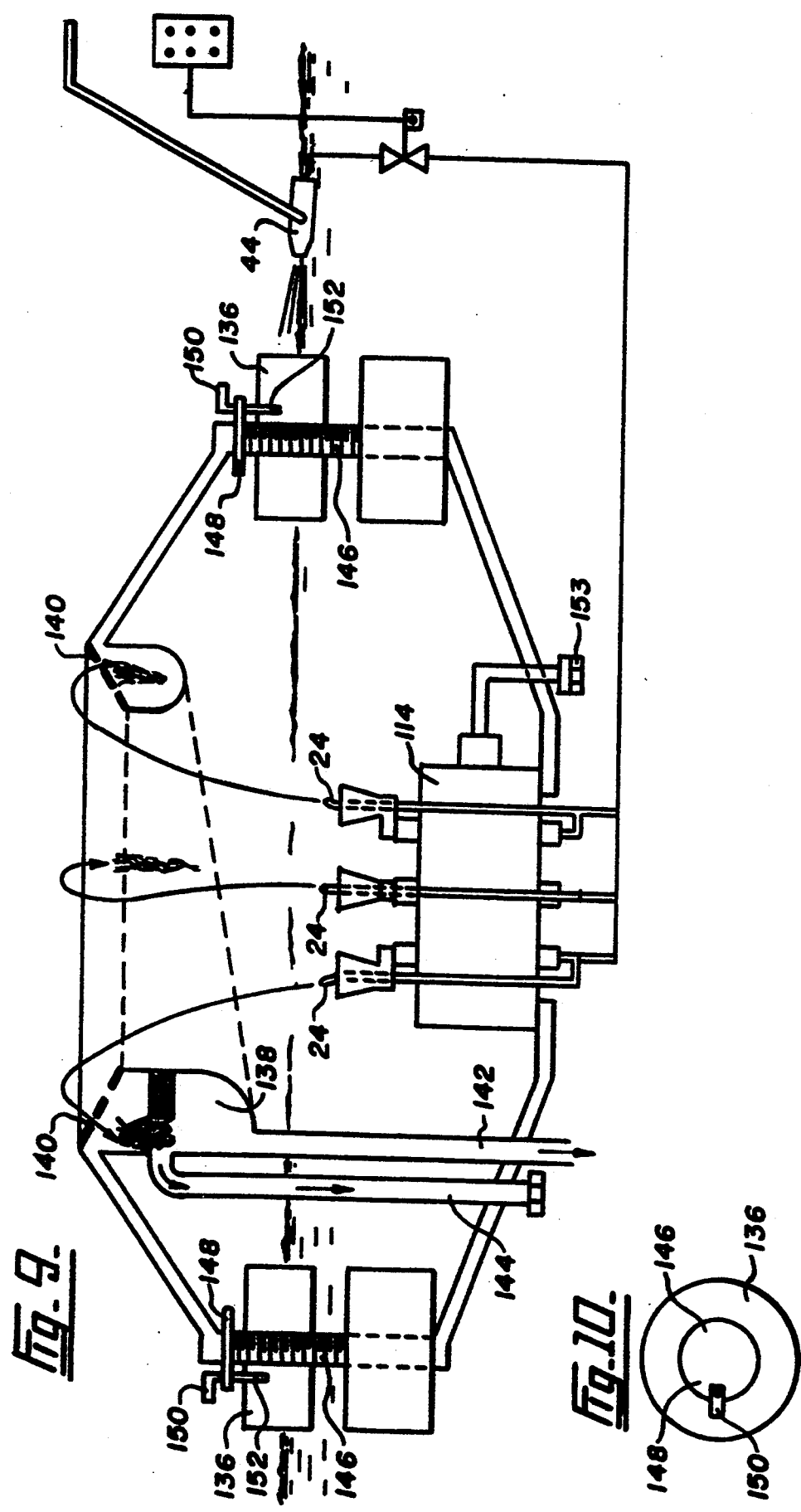

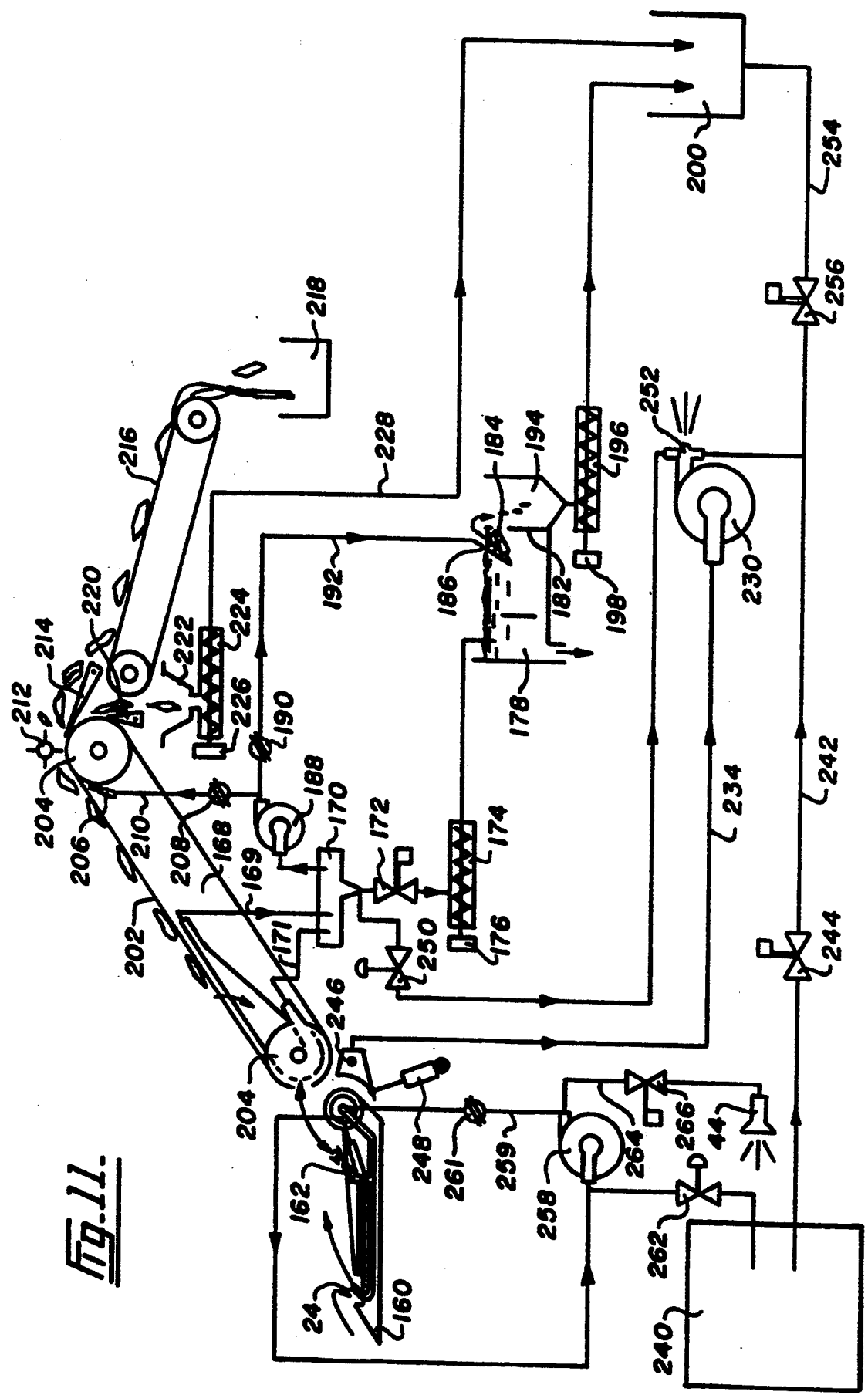

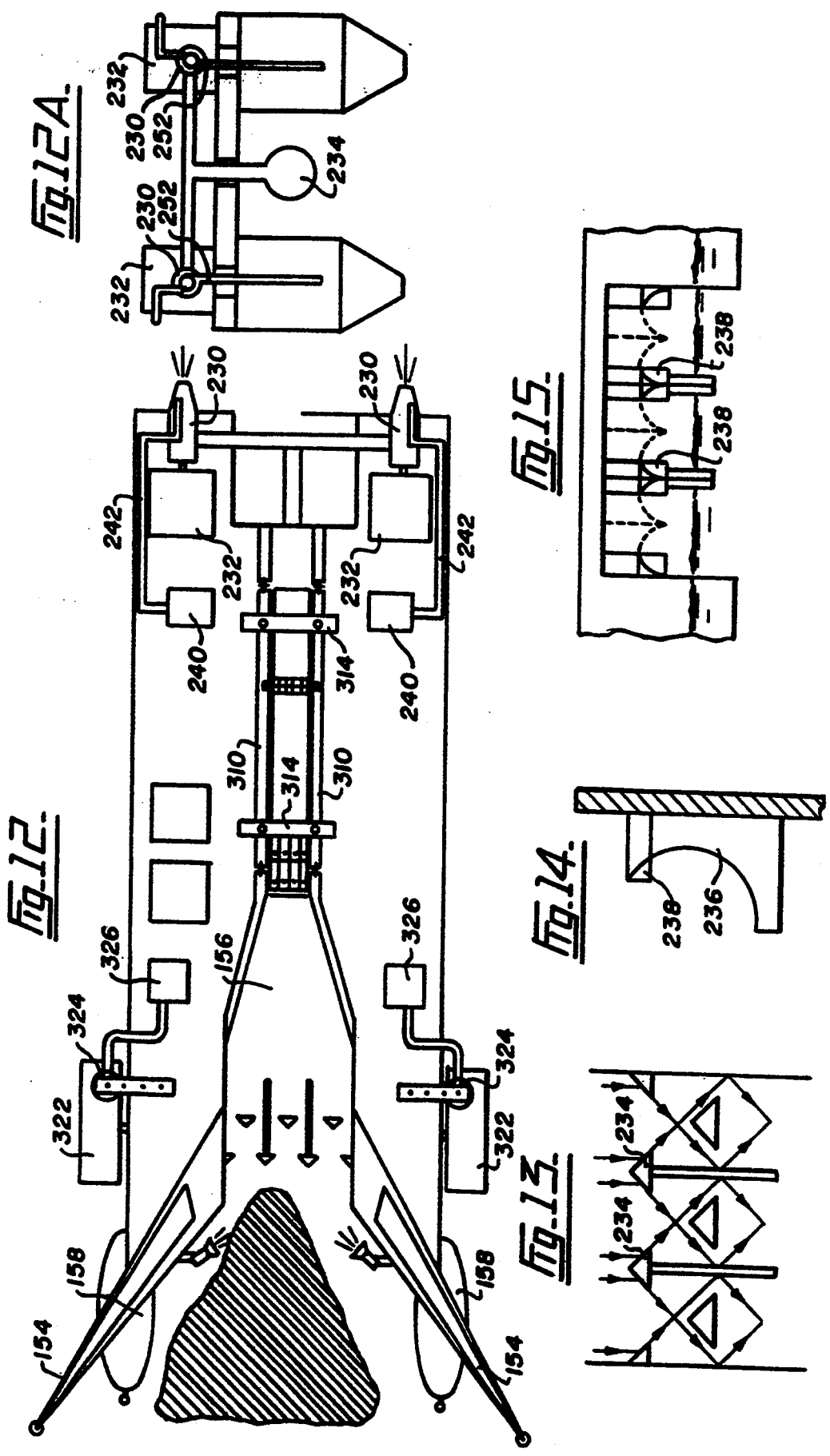

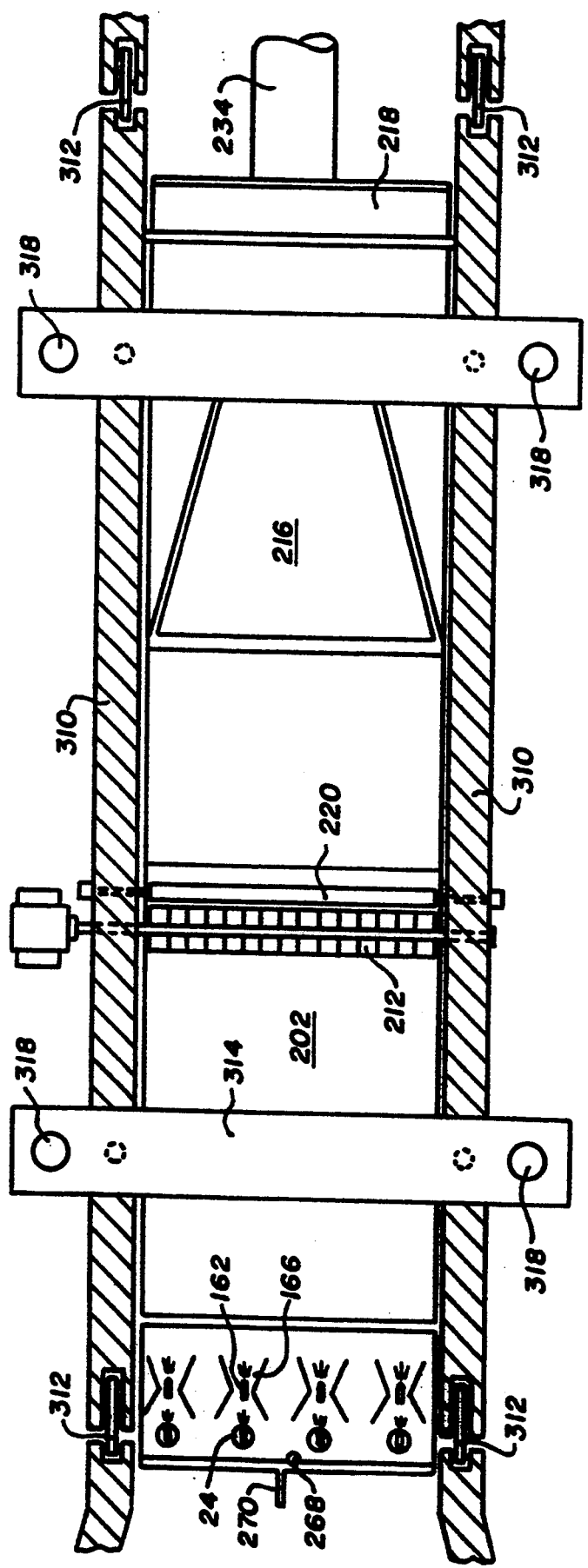

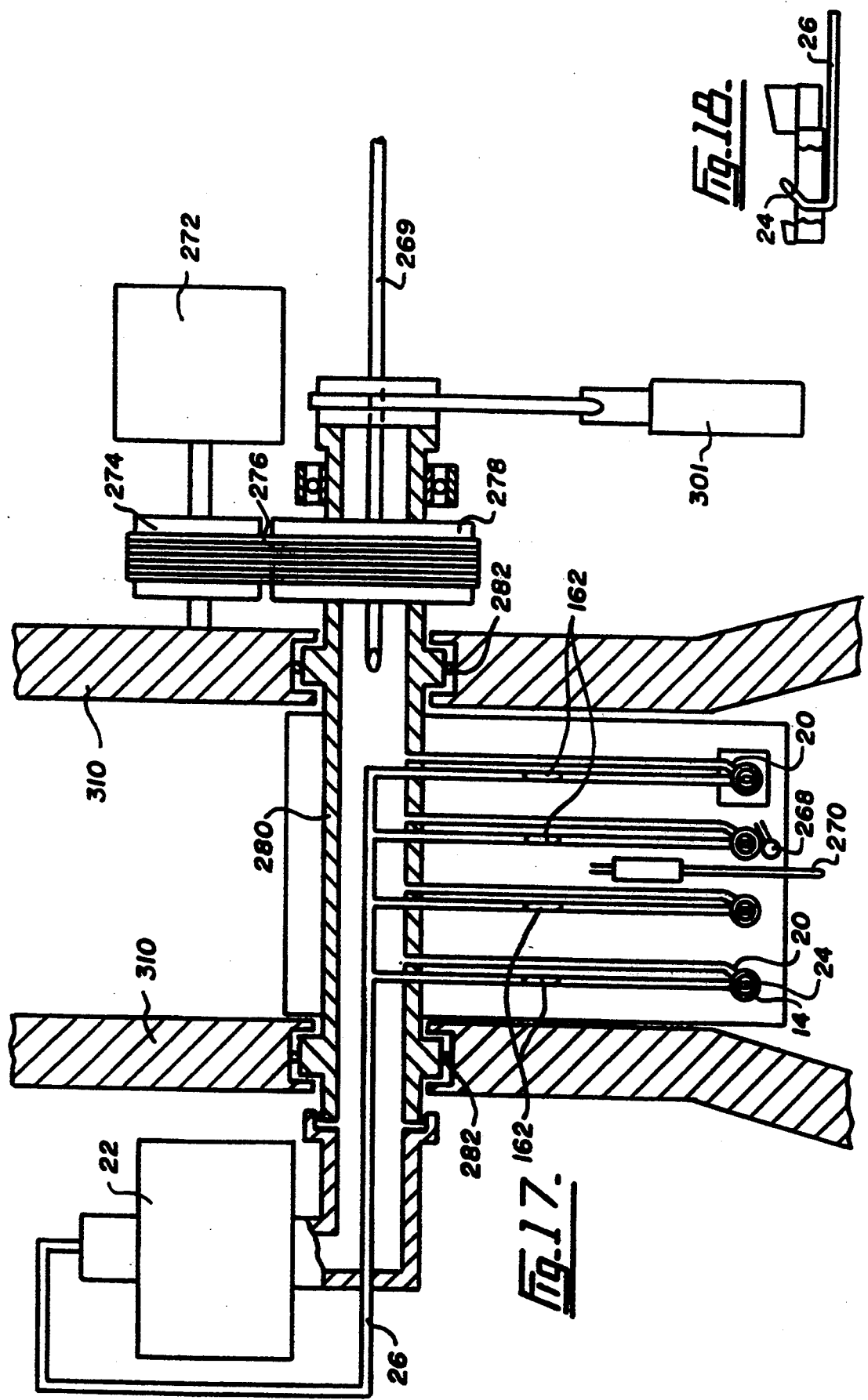

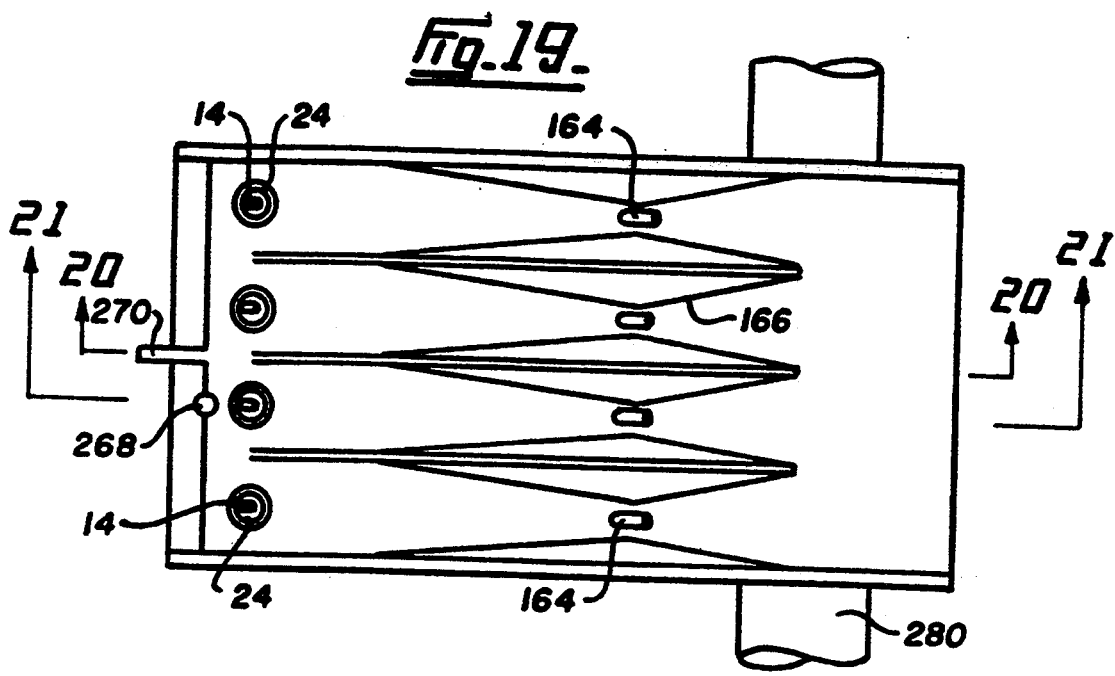
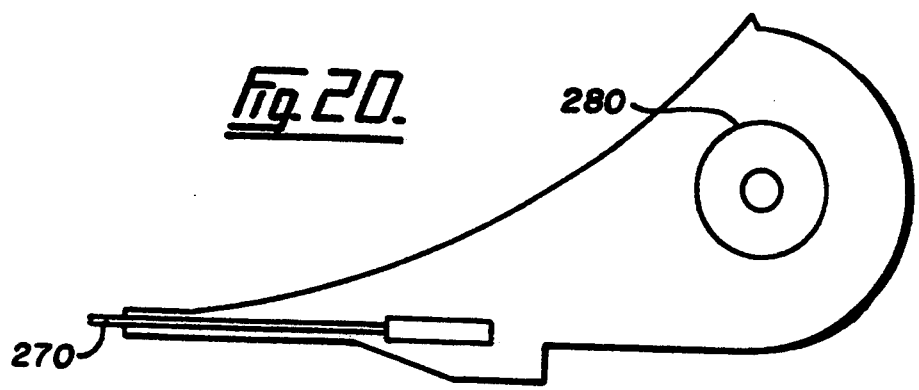
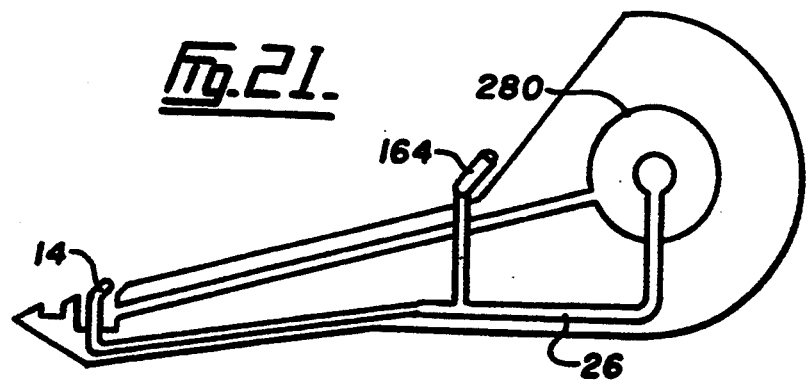

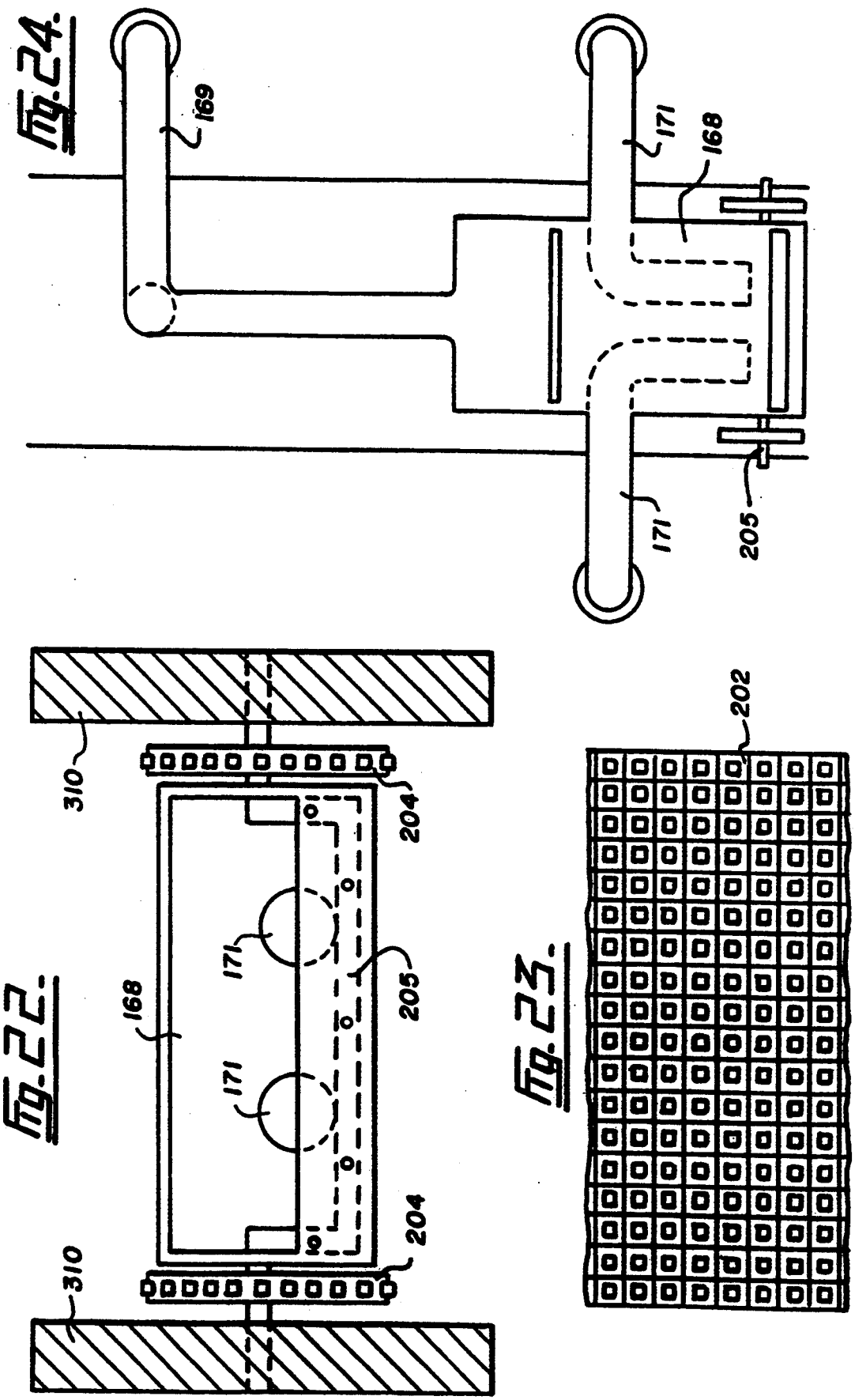

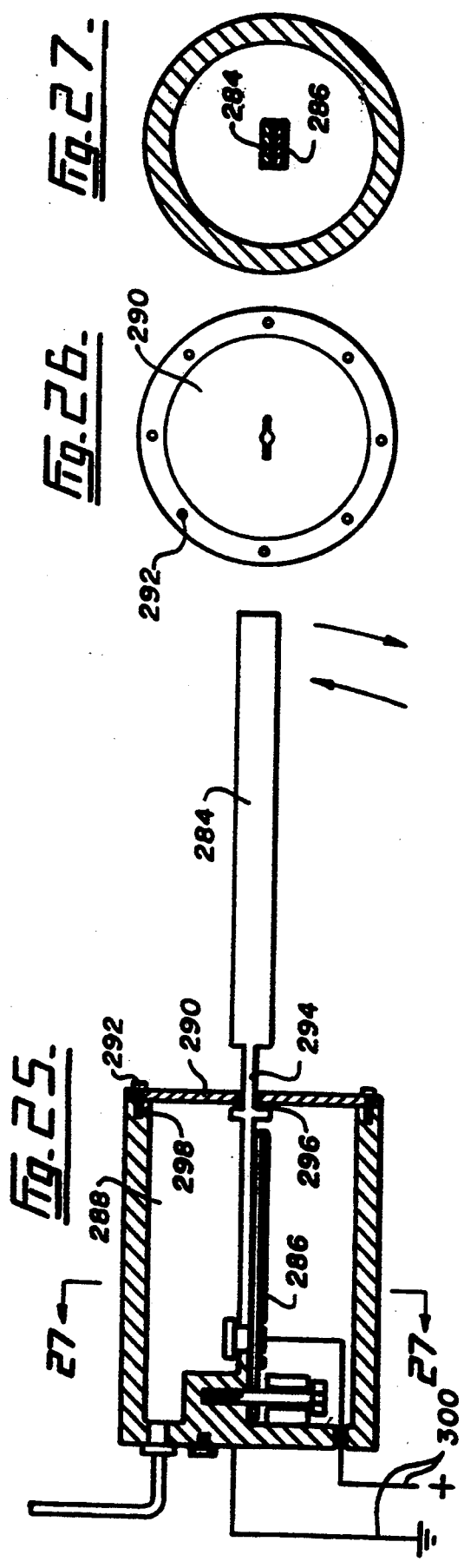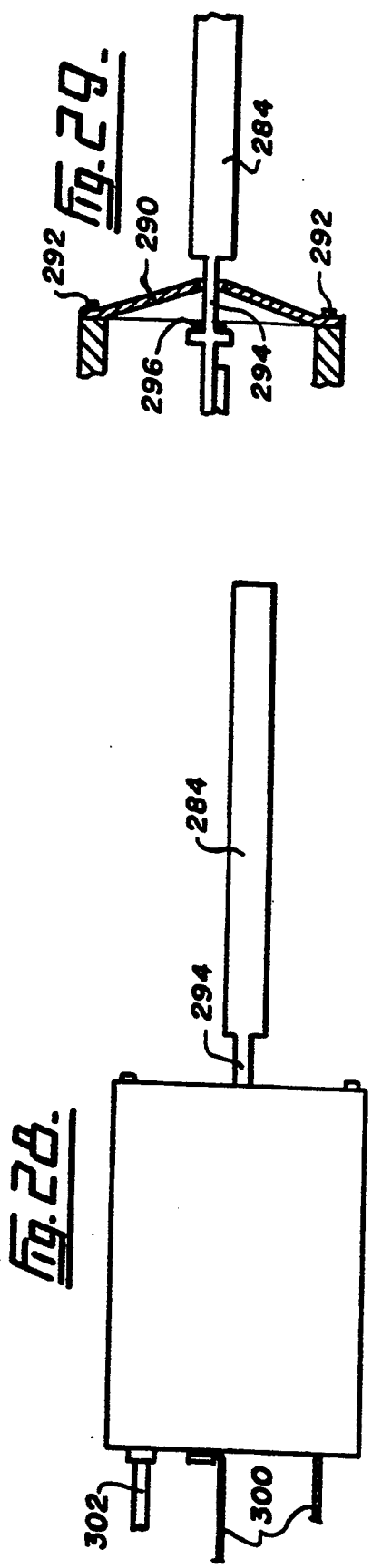

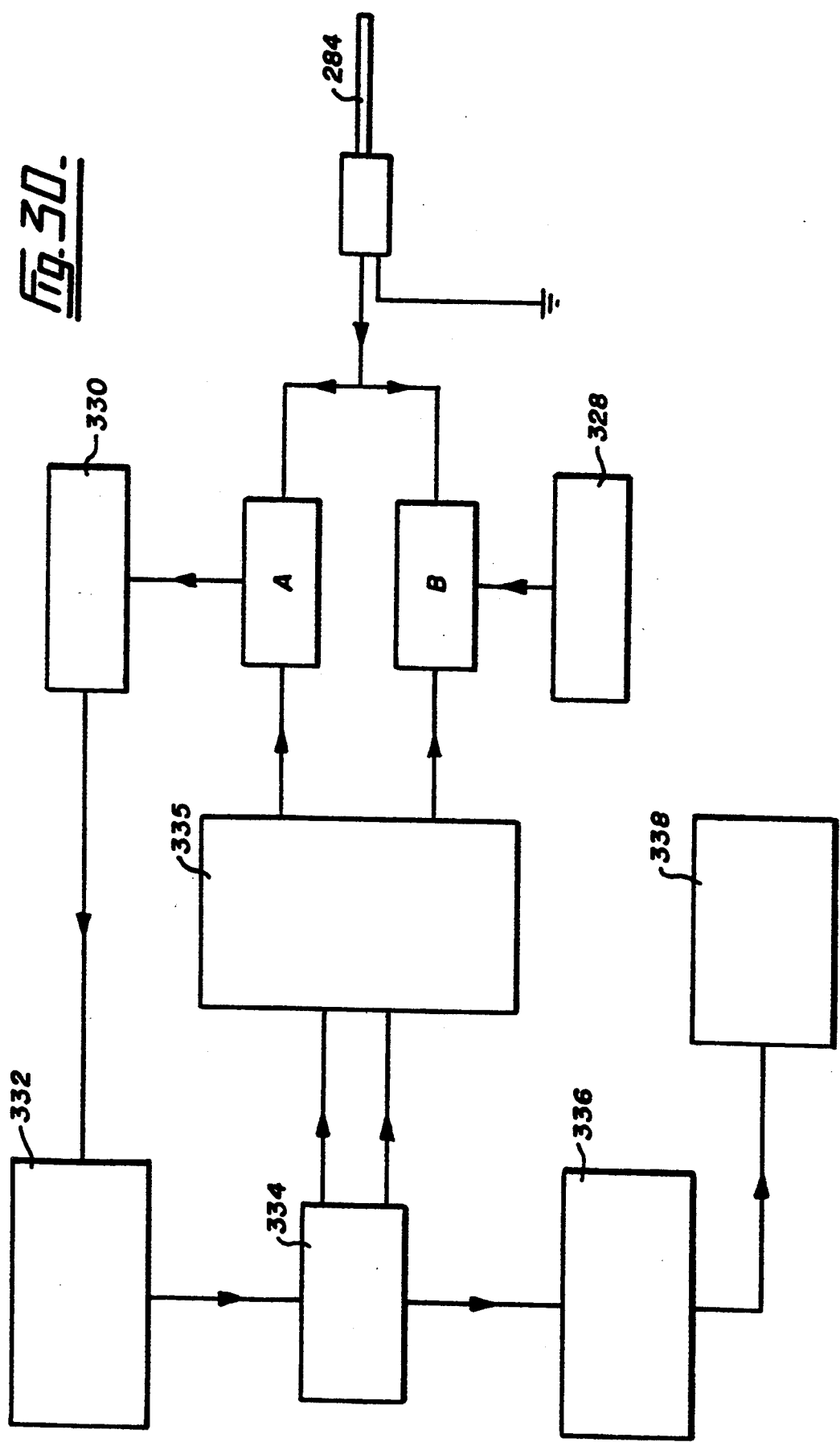

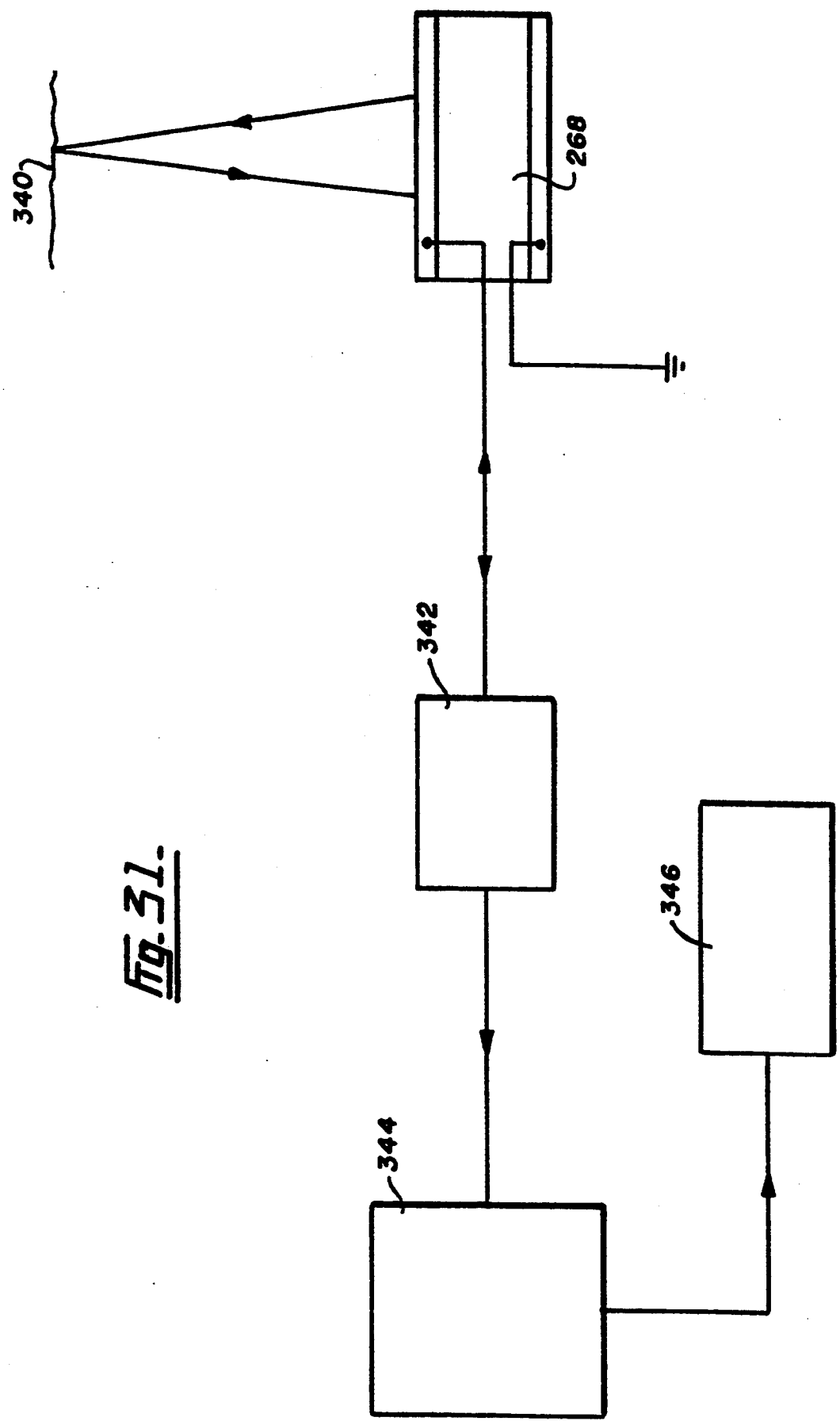

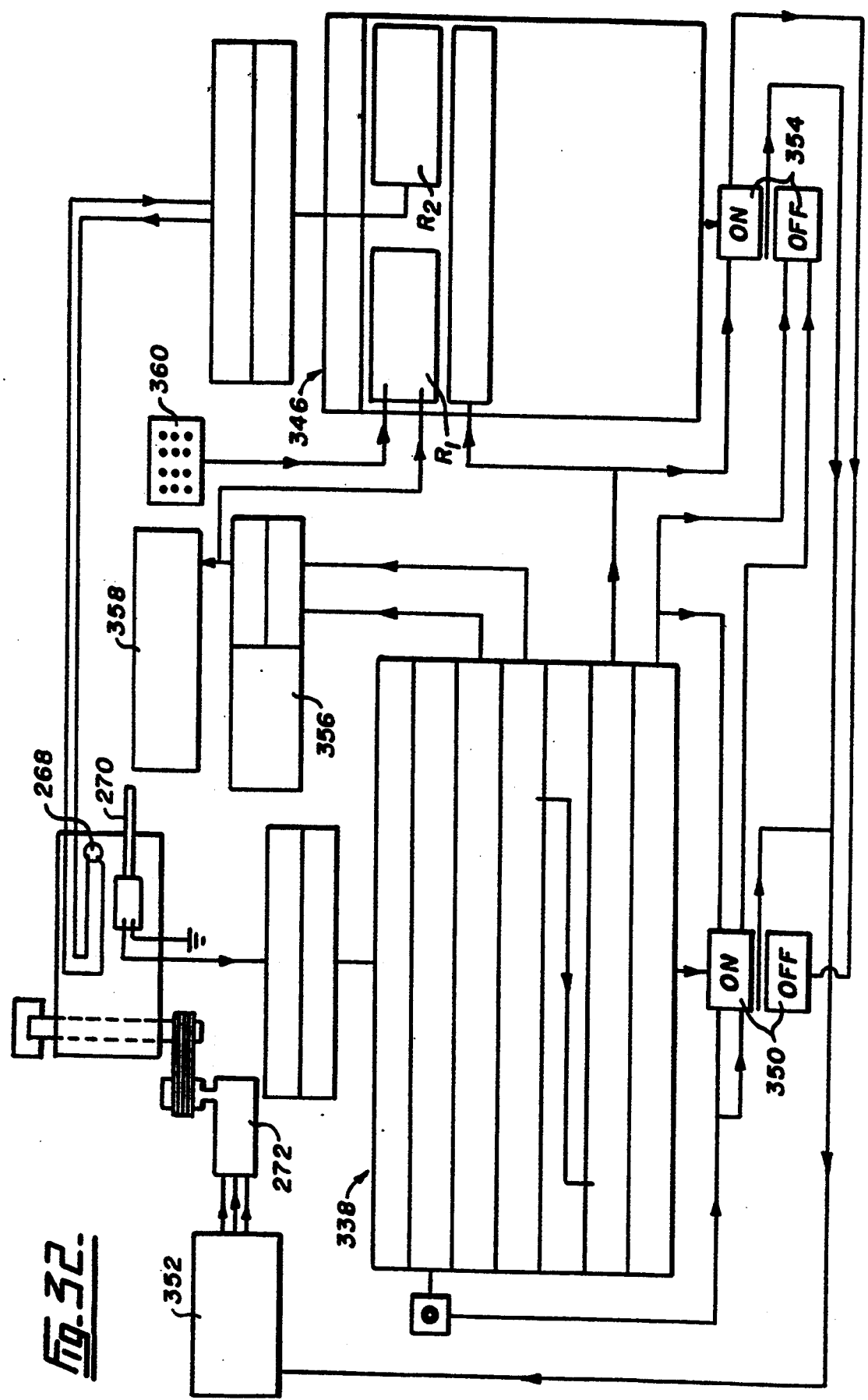

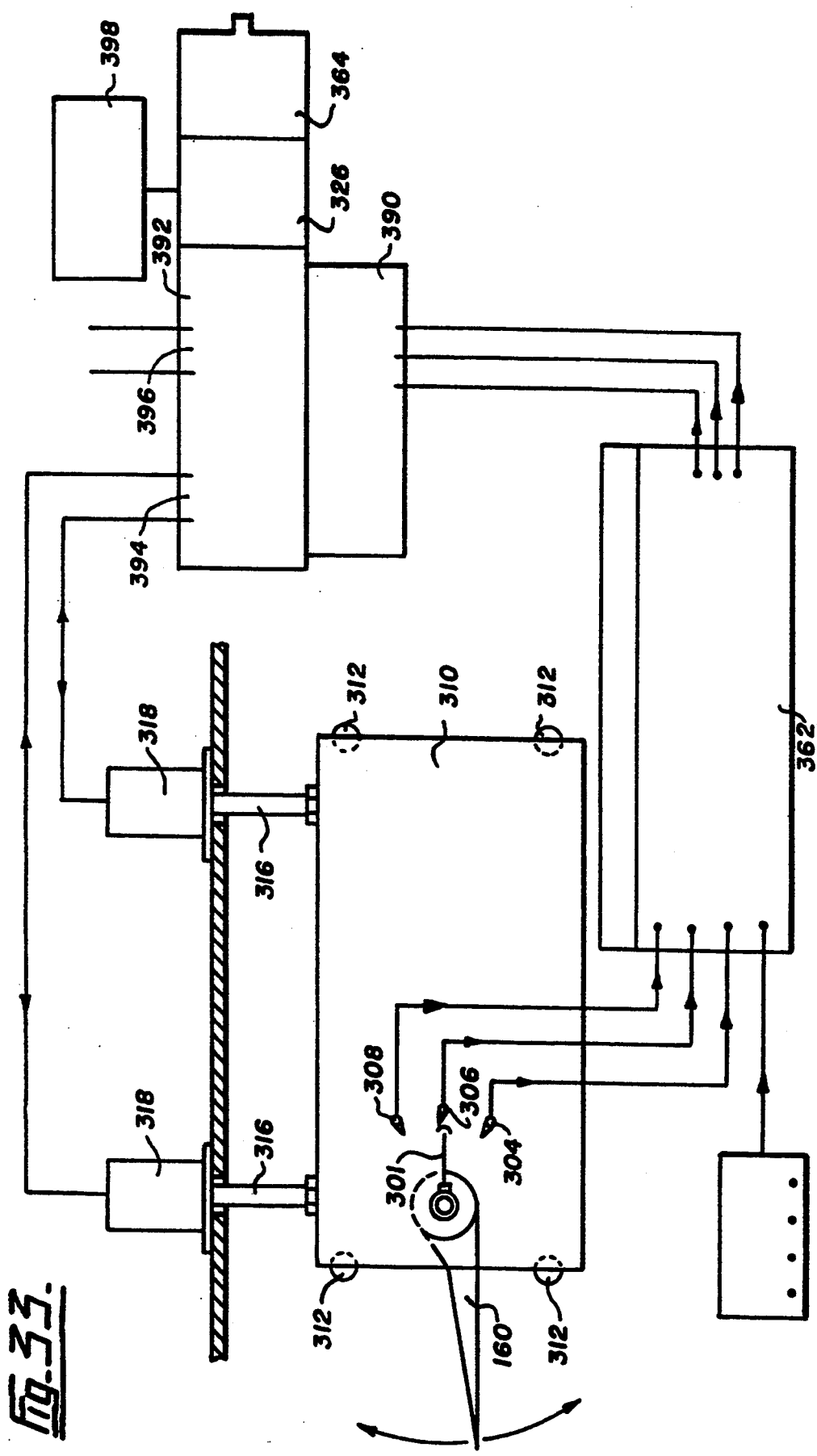

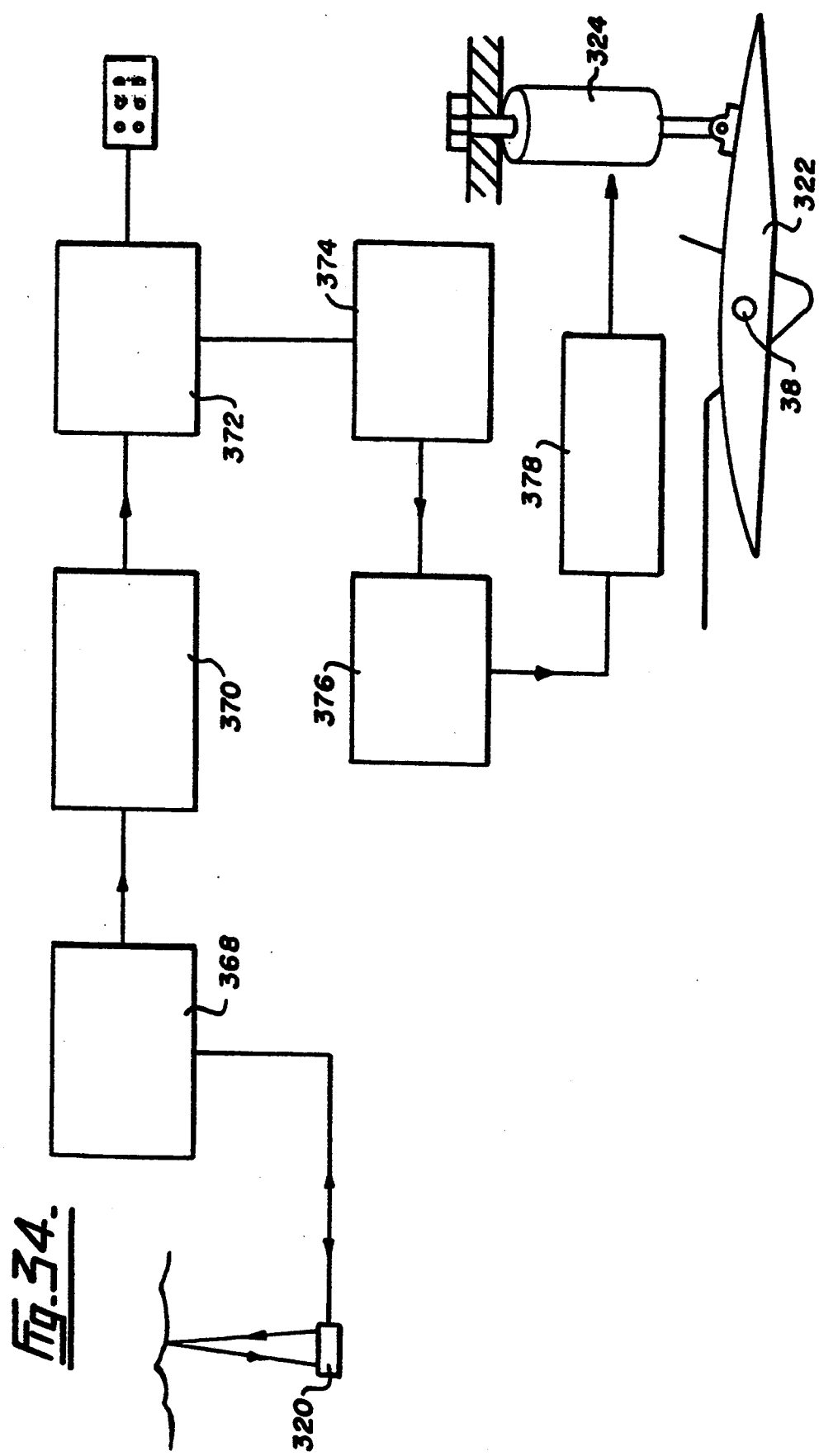

SURFACE SEPARATOR AND DISPERSION APPARATUS

This invention relates to an apparatus to separate two immiscible liquids of different densities that form an upper and a lower layer when together and to a vessel able to separate two immiscible liquids in which the vessel is floating. Although there are numerous situations in industry where it is required to remove one liquid or liquid mixture floating on another, such as the froth floatation process in mining, the oil extraction from tar sands and many others, the invention will be illustrated in its practical embodiment in the removal of oil from water in the petrochemical industry and in the removal of accidental spills of oil on lakes, waterways and oceans.

There have been a substantial number of suggestions for means of removing the spills and previous attempts to clean the spilled oil comprise the use of pressure or suction. Positive pressure has been generated by ceramic or magnetostrictive transducers but such an approach is expensive and difficult to operate. In particular, the transducers have proved incapable of removing highly emulsified oils or foaming material from the surface because of the lessened surface tension forces on which these methods depend.

The use of suction has proved undesirable because of the inability to maintain the inlet to the suction apparatus at the appropriate critical level.

Non-floating vacuum vessels with large intakes are not easily plugged by debris but require large amounts of energy and because of the problems in detecting the oil water interface, they frequently pick up more water than oil.

Dispersion of oil by the use of surface active compounds has been fairly widely practiced. However, bearing in mind the low temperature involved and the means application of the surface active compound, the results have been disappointing. Furthermore, these dispersants are also now regarded as environmentally undesirable and are only used in extreme circumstances.

The use of vessels to collect oil spills has produced disappointing results. The results in calm seas have been poor and the methods have proved incapable of operating in even moderate seas. Again the main problem is the difficulty in detecting the oil water interface. This problem is compounded by the fact that the vessel tends to produce a bow wave in front of the oil pick-up devices. The bow wave tends to push the floating oil away and thus decrease collecting efficiency. Further it is important that there be as clear a path as possible for the water flowing the device if the oil is to be efficiently collected. The prior art frequently mounted the oil collection apparatus either at the bow or the stern of the vessel resulting in unnecessarily large movements of the mechanism relative to the water surface.

These prior art devices are also totally dependent on floatation systems for locating the oil water interface and prior art systems of detecting the interface by this means have been too slow to react to wave action.

U.S. Pat. No. 3,794,175 issued to Stewart on Feb. 26, 1974 describes and claims a vessel to remove floating oil from moderately heavy and relatively calm seas. The vessel of Stewart has a receiving chamber with an upstanding side wall presenting a freeboard of a height sufficient to prevent excessive flooding of the receiving chamber during use in moderately heavy seas. There are nozzles supported on the vessel and positioned to discharge a water jet upwardly through the floating oil and then over the upstanding wall into the receiving chamber. Each nozzle is individually supported by a float mechanism adapted to automatically maintain the jet in a proper discharge attitude with respect to the side wall. The receiving chamber in Stewart includes an annular outer compartment into which the oil is initially delivered. There is an inner compartment. Both compartments are open at their lower ends and during operation a column of recovered oil builds up in the annular outer chamber. As the column increases in depth its lower level drops until eventually the oil is in communication with apertures formed in a vertical separating wall between the inner and outer compartments. The collected oil flows from the outer compartment through these apertures into the inner compartment and rises in that compartment. An oil pick-up pipe leading from a pump, and preferably having a float controlled inlet valve, is provided on the vessel. It includes an inlet positioned in the inner compartment, slightly below the oil surface in the compartment.

It can be seen that Stewart directs the water jet from the nozzles against a film of oil and concentration or build-up of oil does not take place in Stewart until the inner compartment, that is to say the compartment from which the oil pick-up pipe collects the oil.

There is accordingly a clear need for an apparatus to collect oil from the surface of water that can operate in all weather conditions, especially adverse weather conditions.

The present invention seeks to provide such and in its broadest aspect, the invention is applicable to the removal of oil from the surface of water in docks and the like, where calm water can be expected. But the efficiency of the apparatus of the present invention makes it suitable for all weather conditions as well.

Accordingly, the present invention provides an apparatus to separate two immiscible liquids of different densities that form a two phase mixture comprising an upper and a lower layer when together, the apparatus comprising a main body able to receive the two liquids and having a base and an open top; an outlet adjacent to the base of the main body; a pump to pump liquid from the main body through the outlet; a jet generally adjacent the centre of the main body to direct liquid upwardly from the body; means to supply liquid to the jet; float means to allow floating of the apparatus in a mixture of the two liquids; whereby the means to drive fluid from the outlet draws the two liquids into the body and the liquid from the jet forces the top layer of liquid upwardly, to separate the two liquids.

In a referred embodiment the apparatus includes a concentrator that acts to move the upper layer towards the main body.

It is also preferable to include a venturi prior to the jet. In these circumstances the apparatus includes a reservoir to receive a conditioning liquid connected to the venturi. The conditioning liquid can then be drawn into the liquid supplied to the jet. The conditioning liquid may be a dispersant for use in circumstances where the oil cannot be collected and stored.

In a particularly preferred embodiment the main body is a generally truncated, inverted cone and the outlet is tangential to the base of the cone, whereby vortex flow is induced in the main body.

The apparatus may, and preferably usually does, include a plurality of main bodies each with a jet.

In a particularly preferred aspect, the invention provides a vessel able to separate two immiscible liquids in which the vessel is floating, the two liquids being of different densities that form a two phase mixture when together with a first liquid on top and a second liquid below, the vessel comprising a hull having twin floats to define a passage through the vessel; a separator at a leading edge of the hull to separate the first and second liquids and comprising at least one first jet adjacent to the leading edge and at least one second jet aft of the first jet; a supply of liquid at above atmospheric pressure to said jets to remove an upper first liquid from the separator; a source of suction to remove the lower second liquid from the separator; and an intake manifold to receive the first liquid forced from the separator by the jets.

Desirably, the leading edge of the separator is wedge-shaped to facilitate flow of the upper layer of the two liquids into the separator and has a plurality of first jets arranged in a row, and a plurality of second jets, also arranged in a row.

According to particular desirable aspects of the present invention, the vessel includes means to control the position of the separator so that it can be moved as close as possible to the interface between the first and second layers, so that it can determine the depth of the leading edge of the separator and adjust that depth when it becomes excessive or too little and, finally, means to adjust the height of the separator when necessary in order to keep the leading edge of the separator at an appropriate inclination and depth relative to the interface of the two layers.

The invention is illustrated, merely by way of example, in the accompanying drawings in which:

FIG. 1 is a diagrammatic side elevation of an apparatus according to the present invention;

FIG. 1A is a section on the line 1A—1A in FIG. 1;

FIG. 1B is a section on the line 1B—1B in FIG. 1;

FIG. 2 is a plan view of the apparatus of FIG. 1;

FIG. 3 is a diagrammatic side elevation of a further apparatus according to the present invention;

FIG. 4 is a planned view of the apparatus to FIG. 3;

FIG. 5 illustrates a further embodiment of the invention;

FIG. 6 shows diagrammatically a side elevation of a further embodiment;

FIG. 7 is a plan view of the apparatus of FIG. 6;

FIG. 8 is a detail of the apparatus in FIG. 6;

FIG. 9 is a side elevation, on an enlarged scale, of the apparatus of FIG. 7;

FIG. 10 is a detail of the apparatus of FIG. 9;

FIG. 11 is a diagrammatic view of a preferred embodiment of the present invention;

FIG. 12 is a plan view embodying the features shown diagrammatically in FIG. 11;

FIG. 12A is a end elevation of the vessel of FIG. 12;

FIG. 13 is a plan view of a detail of FIG. 12;

FIG. 14 illustrates a detail of the vessel of FIG. 12;

FIG. 15 illustrates a further detail of the vessel of FIG. 12;

FIG. 16 is a partial plan view of the vessel of FIG. 12;

FIG. 17 is a plan view of a detail of the vessel of FIG. 12;

FIG. 18 is a detail of FIG. 17;

FIG. 19 shows a further detail of a vessel of FIG. 12;

FIG. 20 is a section on the line 20—20 in FIG. 19;

FIG. 21 is a sectional on the line 21—21 in FIG. 19;

FIG. 24 shows a detail of a vessel of FIG. 12;

FIGS. 22 and 23 show details of the conveyor belt system used on the vessel of FIG. 12;

FIG. 25 illustrates probe used on the vessel of FIG. 12;

FIG. 26 is an end elevation of FIG. 25;

FIG. 27 is a section on the line 27—27 in FIG. 25;

FIG. 28 is an external view of the probe shown in section FIG. 25;

FIG. 29 is a detail of FIG. 25;

FIG. 30 is an illustration of a control system used on the vessel of FIG. 12;

FIG. 31 illustrates a further control system used on the vessel of FIG. 12;

FIG. 32 illustrates a composite control system use on the vessel of FIG. 12;

FIG. 33 illustrates diagrammatically a control system of the vessel of FIG. 12; and FIG. 34 illustrates further control for the vessel of FIG. 12.

FIGS. 1, 1A, 1B and 2 show an apparatus to separate two immiscible liquids of different density that form an upper layer 10 and a lower layer 12 when together. A typical example, is a mixture comprising oil and water. There is a main body 14 able to receive the two liquids and having a base 16 and an open top 18. The main body 14 is generally a truncated cone and inverted. There is an outlet 20 arranged tangentially at the base 16 of the main body 14, as shown particularly in FIG. 1A. A pump 22 communicates with the outlet 20.

There is a jet 24 generally adjacent the centre of the main body 14 and able to direct a liquid upwardly from the main body 14 as shown particularly in FIG. 1. Liquid is supplied to the jet through line 26. In the embodiment of FIG. 1 line 26 is controlled by valve 28 and the supply of liquid to the jet 24 is from the outlet of the pump 22.

The jet is located generally, when the apparatus is use, in a range extending from just above the interface between the two liquids slightly above the floating liquid. Similarly, the open top of the body 14 is located at a position from just below the interface of the two liquids to just below the floating liquid-air interface.

There are floats 30, see particularly FIG. 2, to enable the apparatus to float in water, particularly a source of polluted water, and the main body 14 is mounted to the floats 30 by simple structural members 32. Line 26 includes a venturi 34 mounted to the main body 14 at threaded, flexible joint 36 and in communication with a reservoir 38 through line 40, controlled by valve 42.

A concentrator 44 is shown comprising a body having an inlet 46 and an outlet 48, directly downwardly. The fluid supply to the concentrator 44 is through line 50 from the pump 22, controlled by valve 52.

Finally, the apparatus includes a tank 54 and the jet 24 is formed at its top in such a way that liquid forced from the jet is at an angle to the vertical and goes to the tank 54. From the tank 54 oil is fed to storage through line 56.

In operation of the embodiment of FIGS. 1, 1A, 1B and 2, the apparatus is floated in a body of water from which it is required to separate a floating layer. The apparatus is typically used in a dock or lake and electrical supply will be from the land.

When the apparatus is floating in the water, the pump 22 is switched on, liquid is drawn through the main body 14, as shown by the arrows, through the outlet 20 in such a manner as to establish vortex flow as shown particularly in FIG. 2. For the preferred mode of operation the jet 4 is used to direct liquid to the tank 54. In those circumstances valves 28 and 52 are open and valve 42 is closed. The jet produced forces liquid upwardly by pressure. The vortex flow forms a hollow on the surface of the water, above the main body 14 so that the jet 24 forces liquid through a concentrated area of the oil. Similarly, the concentrator 44 forces the upper layer, by the action of the fluid passing through outlet 48, towards the main body 14 to assist the flow induced by the drawing of liquid down the main body 14.

As indicated above, the jet may be anywhere in a position from just above the interface between the two liquid to slight above the floating liquid. When slightly above the floating liquid the jet acts to draw the floating liquid upwardly.

Concentrator 44 has its outlet arched downwardly as shown particularly in FIG. 1B. Thus, the jet coming from the outlet tends to lift the edge of the concentrator adjacent the main body 14. This allows air to be trapped underneath the jet and the liquid on the surface is efficiently moved in the desired direction by the liquid spray directly and by the entrained air forming an air current.

The material from the tank 54, which will be upper layer 10 and water, but with a high proportion of upper layer liquid, can be subsequently treated to ensure complete separation, for example by settling.

In certain circumstances, it may not be possible to feed the upper layer to the tank 54. In those circumstances, valve 42 will be opened. A dispersant, in the form of a surface active compound, is then drawn by the venturi 34 into the jet 24 and used to assist in dispersion of the upper layer. In those circumstances the upper layer, dispersed by the dispersant, will be fed back into the body of water.

The proportioning of feed to the concentrator 44, to the jet 24 and to the venturi 34, can easily be controlled by the valves 28, 42 and 52. Typically such valves will be motorized.

The concentrator 44 can be moved around. The downward direction of the jet means that the front of the concentrator is raised slightly, as discussed above, and tends to travel on a cushion of air trapped between the concentrator 44 and the surface.

FIG. 3 illustrated diagrammatically an embodiment functioning on the same principle as the embodiment of FIG. 1 but, typically, it can be used in a larger area of water.

As in FIG. 1 the apparatus of FIGS. 3 and 4 include main bodies 14 each provided with a jet 24 and a tangential outlet 20 at the base of the body. There is a supply of liquid to each jet 24 through lines 26. A common venturi 34 is used with a water supply of pressurized water through a line 58 controlled by a valve 60. There is a concentrator 44 fed by liquid passing through the venturi 34. The drawing also shows a steam supply through line 62 to a heat exchanger 64. The steam can be used to heat the pressurized water supply in line 58 and the heated water fed through a hot water regulator 66 to a line 68, feeding the jets 24 of the main bodies 14. There is an air supply line 70 feeding two lines 72 and 74, each controlled by an air regulator 76 and 78. The first line 72 feeds an air motor 80 which feeds an auger 82 to drive oil to storage through line 84. The second air line 74 feeds to jets 86 used in a further oil separator 88.

The jets 86 are directed towards openings 90, in the rear wall 92 of the oil separator 88. As shown particularly in FIG. 4 openings 90 are each formed as a venturi, that is having a central restriction. The jets passing through the openings 90 therefore have a slight lifting action to assist the movement of viscous material over the rear wall 92 which acts as a weir. Simultaneously, a drag force is produced on one side of the wall and a pushing force on the other side. The result is the material that is viscous can easily move over the weir with a minimum of air pressure. By using air, the material collected remains undiluted. However, in some cases, for example, where it is desired to modify the flowability for pumping, a solvent may be fed in place of air through the line 74.

There is a trough 94 to receive the second layer, forced upwardly by the jets 24 in the main bodies 14.

The liquid, which will predominant be the upper layer, from the trough 94 is fed to separator 88. The separator 88 has an outlet 96 in the base 98 to allow the lower liquid, water, to drain and baffles 100 within the separator 88 to prevent the upper layer being drawn down with the water. The jets 86 force the upper liquid upwardly through openings 90 into oil collector 102 which, again, has an outlet 104 feeding the oil downwardly into auger 82. From the auger 82, the oil is fed to a reservoir for oil, which may be a barge, through line 84. A float or ballast container 108 to control the trim of the vessel is also shown.

FIG. 4 shown further structural details but is simply a typical view of how the components of FIG. 3 might be arranged on a vessel. There is control panel 110 in which controls for the varies lines and for the motorized valves are located. FIG. 4 also shows the presence of a platform 112 upon which the venturi 34 is mounted. Control wheels 114 can be used to raise or lower a tubular frame 116 upon which the main bodies 14 are mounted. The wheels 114 are on threaded shafts that engage housings on the frame. Thus rotation of the wheels raises and lowers the frame 116. Ballast may be placed in the tank 108 to control the height.

In operation of the apparatus of FIGS. 3 and 4, the trim of the vessel is adjusted while the vessel floats in a slick. Ballast is added to the tank 108 and wheels 114 rotated to adjust the level of the jets 4 appropriate for the water pollutant interface. Because of the steam supply and the heat exchanger the device can be operated at relatively low temperatures. Thus, water, heated if necessary, is fed through the jets 24 of the main bodies 14. The water rising upwardly raises the upper layer in the main bodies 14 as described in FIG. 1. The pollutant is gathered in the trough 94 and feeds to the separator 88. As shown in FIGS. 3 and 4 the last main body 14 feeds directly into the separator 88, typically to avoid heat loss in conditions where heat is required. The control valve 60 is opened to deliver unheated water to venturi 34. Unheated water is then fed to the concentrators 44 which concentrates the upper layer in the vicinity of the main bodies 14. The venturi 34 acts to draw water from the main bodies 14, out of the tangential outlet ports 20. Because of the tangential arrangement of the outlet ports 20, flow in the main bodies 14 is in the form of a vortex with a depressed upper surface acting as a concentrator for the upper layer liquid. From the main body 14, the upper layer liquid is fed to the separator 88, as described above. With this embodiment of the invention the relatively crude means of controlling the trim of the vessel is satisfactory. It is intended for use on lakes or within oil refineries and the like where water conditions are relatively static.

FIG. 5 illustrates equipment useful in a water-way 118. There is a cross member 120 extending across the water-way 118 with support columns 122, upon which a common pump body 114 is mounted. The height of the concentrator 44 is also controlled by being mounted on a column 124 attached to cross member 120. The jets 24 feed upwardly into a vacuum funnel 126, the necessary reduced pressure for which is provided by a vacuum truck 128. Supply to the concentrator 44 is via motorized valve 130. The height of the jets 24 is adjusted relative to the water level by the columns 122 and water flow drives the upper level upwardly, directly into the vacuum funnel 126. The raised liquid is fed directly to the vacuum truck 128. The height of the vacuum funnel 126 may be controlled by threaded member 132 engaging the cross member 120 to engage the funnel 126. The device is shown mounted on a waterway 118 with a truck 128 however the arrangement can also be mounted on a small vessel.

FIG. 5 shows the combination of air vacuum, positive and negative liquid pressure together in the same area for pollutant removal.

FIG. 6 to 10 illustrate a further embodiment for use in small, quiet inland waters, not subject to violent surface movement. There is a plurality of jets 24 mounted on a platform 134 that is mounted on floats 136. A concentrator 44 is also shown. The jets 24 feed into a circular receiving channel 138 provided with a perforate upper surface 140 to filter debris. The arrangement of the jets 24 and the main bodies 14 is similar to that shown in FIG. 5. The water drains through an outlet 142 and the upper layer goes into collection tube 144. In this regard channel 138 is inclined downwardly which ensures that the water gravitates to tube 144 and the upper layer, floating on the water, goes to collection tube 144 and from there to storage.

Because the device is for use in still water, ballasting of the system is relatively simple. There are threaded columns 146 at each corner of the vessel. Each buoyancy tank 136 is formed in two parts, a fixed lower part and an upper part threaded to be received on the threaded columns 136. A collar 148 is received on each threaded column 146. A locking member 150 is a slide fit through an opening in the column to engage on opening 152 in the tank 136. There are four openings 152 shown. Thus locking member 150 may be removed, the tank 136 rotated on the threaded column 146 to the appropriate level and the locking member 150 then returned, as shown in FIG. 9, to lock the buoyancy tank 136 in the desired position.

Operation of the device is precisely as described for previous embodiments. In this illustrated embodiment there is a battery compartment 153 for the electrical supply to the pump 124.

FIGS. 11 to 34 illustrate a particularly preferred embodiment of the present invention.

These drawings show a vessel able to separate two immiscible liquids in which the vessel is floating. Again as in previous embodiments, the two liquids are of different densities that form a two phase mixture when together with a first liquid, on top, and the second liquid below. The vessel has a hull having twin floats 154 as shown particularly in FIG. 12, forming a passageway 156 through the centre of the vessel. That passageway 156 starts at the floats 154 which widen outwardly at bow members 158 to act as concentrators for the oil and narrows through the vessel to the stern of the vessel.

There is a separator between the floats 154 to separate the first and second liquids. As shown particularly in FIG. 11, the separator is a wedge 160 which facilitates separation of the two layers. There are first jets 24 adjacent the leading edge of wedge 160 and second jets 162 after the first jets 24. The arrangements is most clearly shown in FIG. 16. FIG. 19 also shows the arrangement. The jets 24 are as in the previous embodiments. That is there is a main body 14 and the jet 24 is positioned in the centre of that body 14. As shown in FIG. 17 there is an outlet 20 tangential to the main body 14 and a liquid supply to the jet 24 from pump 22 through lines 26. FIG. 17 shows the pump 22 which supplies liquid to the jets 24 and receives liquid from the outlets 20, thus establishing both the jet flow and the vortex flow necessary in the main body 14.

The second jets 162 comprise a jet member 164 set in a recessed venturi channel 166 as shown most clearly in FIGS. 11, 16 and 19. Supply of liquid is distributed below.

There is an intake manifold 168 after the jet 162 into which the jets 162 feed; The intake manifold 168 is at reduced pressure by virtue of its communication through line 169 with a vacuum tank 170—see FIGS. 11 and 24.

The arrangement is such that liquid drawn to the vacuum tank 170 through line 171 passes via a valve 172 to auger 174 driven by motor 176 which then feeds to a separator 178. The lower layer passes out through outlet 180 and the upper layer passes over the weir 182, and through venturi 184 assisted by air jet 186, generated by pump 188 passing air through a pressure regulator 190 along line 192. The air jets 186 lift the oil into a reservoir 194. The reservoir liquid is pumped by an auger 196 driven by motor 198 to a storage tank 200. The operation of the jets 186 is as described for FIG. 3 for jets 86.

The intake manifold 168 is protected by an open-mesh conveyor belt 202 mounted on rollers 204 on axle 205 shaped to intrude as little as possible into manifold 168. There are compressed air jets 206 to lift the debris on the conveyor belt 202 adjacent the upper end. The jets 206 are supplied from the pump 188 via a pressure regulator 208 acting in line 210. The jets 206 lift the debris which is then struck by an impeller 212 and forced across a ramp 214 onto a second conveyor belt 216 and also having a mesh structure, down which solid debris passes to a debris storage tank 218. There is a doctor blade 220 to remove liquid adhering to the conveyor belt 202, not lifted by the compressed air jets 206. The blades peels off the liquid, generally thick material, into a hopper 222 into the auger 224 driven by a motor 226, which drives the liquid along the line 228 to storage tank 200.

As shown in FIG. 12 the vessel includes drive motors 230, typically jet motors, driven by diesel engines 232. A fluid intake supply line 234 is shown in FIG. 12A. The motors 230 draw fluid up and forces it out into a jet in a conventional manner. This facilitates the operation of the device in shallow water and has other advantages discussed below.

As shown in FIG. 12, the vessel widens outwardly at its bow to increase flow through of the liquid and thus to act as a concentrator for the oil. The vessel desirably includes means to reduce wave action between the booms. As shown in FIG. 13, these means comprise triangular bodies 234 that act in relatively rough seas to deflect waves and dissipate the power, and thus the height of any waves present.

Higher waves are acted upon by deflectors 236 again to dissipate the energy. The vessel also includes arcuate deflectors 238 as shown in FIG. 14 and FIG. 15 which act to direct the waves downwardly, suppressing excessive wave height.

Where it is not possible to pass the oil to storage, the vessel may include storage tanks 240 for a dispersant. The dispersant passes through line 242, controlled by a valve 244 to motor 230 which also receives water from an inlet 246 immediately behind the wedge 160. The height of the inlet is controlled by a hydraulic cylinder 248 to ensure that an adequate supply of liquid over wedge 160 without oil has been drawn into inlet 246 to the motor. The oil is passed from the of vacuum tank 170, controlled by a valve 250, to a venturi 252. At the same time dispersant is drawn through the line 242 under the action of the venturi 252, induced by the flow from the motor 230 through the venturi 252. The result is a vigorous mixing of oil from the tank 170, water from the inlet 246, going through motors 230, and dispersant. The mixed liquid, including the dispersed oil, is passed out from the venturi. Oil may also be drawn from the tank 200 through the line 254, controlled by a valve 256.

The above system of dispersant use provides extremely vigorous mixing of dispersant with the liquid to be dispersed. The arrangement is most clearly shown in its structural details in FIG. 12A. As shown there, the tangential input at the venturi 252 at the jet motors 230 causes rotation of the oil and dispersant around the core of the discharge of the motors and enabling the oil and dispersant to mix first before mixing with the rest of the water in the jet motor, coming from line 234. This decreases the amount of dispersant that needs to be used.

Pump 258 also controls the flow of the dispersant, through the line controlled by the valve 262. The liquid from the pump 258 is forced through a line 264, controlled by a valve 266 to a concentrator 44, which acts as described in previous embodiments. Pump 258 also supplies liquid to jets 162 through line 25A controlled by regulator 261.

The invention of the present application has a number of sophisticated means of controlling the position of the wedge 160. In particular, and as shown in FIG. 16, the wedge 160 includes sensors. A first sensor 268 detects the depth of the wedge 160 below the surface of the liquid and a second sensor 270 detects the liquid/liquid interface. The output from both sensors can be combined to measure the thickness of the upper layer. Electrical supply is through conduit 269.

The wedge is maneuvered by a motor 272, for example a step motor, driving a drive pulley 274 to drive a belt 276 that drives a driven pulley 278 mounted on a shaft 280. The shaft 280 is attached to the wedge and bearings 282 allow the shaft 280, and thus the wedge 160, to pivot relative to the vessel.

The operation of the motor 272, and thus rotation of the shaft 286 and of the wedge 160, is controlled by the second sensor 270 which detects the interface between the first and second layers An example of such equipment is shown in FIGS. 25 to 29. FIG. 25 shows a probe 284 mounted to a piezoelectric ceramic member 286 in a chamber 288. The probe 284 extends from the chamber 288 through a sealing diaphragm 290 that is flexible and is attached to the chamber at 292. The probe 284 includes a recess 294 and an O-ring 296 is mounted in the recess 294 to above the diaphragm 290. The probe 284 and the ceramic member 286 are attached to the body of the chamber 288 at 298 by bolts. There are electrical connections 300 across the ceramic member 286 and the probe 284 as shown in FIG. 25 to allow application of an alternating current.

There is an air supply from air line 302 at slightly greater than atmospheric pressure to fill the chamber 288. This assists in sealing the chamber 288 but is also a means of ensuring that when the sensor is in use, additional pressure can be applied to move the diaphragm 290 away from the O-ring 296 so as not to interfere with the vibration of the probe while maintaining a seal.

As described below the probe 284 can give information as to where the wedge is, that information is passed to the motor 272, again as described below, which then rotates the shaft 286 so that the leading edge of the wedge 160 aligns with the interface between the first and second layers of liquid.

The wedge 160 should be reasonably horizontal to operate effectively. In order to ensure this position the wedge is provided with limit switches 304, 306 and 308 as shown particularly in FIG. 33. At a more or less horizontal inclination of the wedge 160, as shown in FIG. 33, centre limit switch 306 is activated by contact 301 on wedge 160 indicating to the system that no adjustment of the wedge position is necessary.

On excessive downward rotation of the wedge 160 upper limit switch 308 is activated and on excessive upward movement of the wedge lower limit switch 304 is activated.

When either the lower 304 or upper 308 limit switch is activated the rotation of the wedge 160 is more than ideal and, in the circumstances, the apparatus permits adjustment of the location of the wedge.

To enable this, and as shown in FIG. 33 and in FIGS. 12 and 16, the equipment mounting the wedge 160, and the equipment mounting the conveyors 202 and 206 and the driving equipment for the wedge and the conveyors, are mounted on walls 310 that can be raised and lowered relative to the booms 154 on which they are mounted. The walls 310 are mounted on the vessel by roller guides 312. Cross members 314 extend between the walls 310 and rams 316 of hydraulic cylinders 318 extend from cross member 314 to engage the walls 310. By this means the walls 310 can be raised or lowered and, with them, the wedge 160 and associated equipment for gathering the upper layer of liquid.

A final adjustment for use in adverse weather is the provision of an ultrasonic transducer 320 located adjacent the bow of the vessel. This transducer 320 is able to transmit and receive a signal to determine water height, in this case wave height. There are stabilizers 322 on each side of the vessel, as shown particularly in FIG. 34. These stabilizers 322 are mounted on hydraulic cylinders 324 shown in FIGS. 12 and 34. The trim of the vessel can thus be adjusted as the transducer 320 sends a signal indicating a certain wave height, the stabilizers 322 are instantaneously adjusted to alter the trim of the vessel by having fluid pumped to a form of cylinder 324 by a pump 326.

Control circuits for the various control features of the vessel of FIG. 12 are shown in FIGS. 30 to 34. FIG. 30 shows a circuit for control of the sensor to determine the position of the oil water interface. Gate B connects an oscillator 328 and the piezoelectric ceramic member 286, the connection is shown in FIG. 25. When the circuit is completed the ceramic member 286 vibrates along its longitudinal axis. The probe 284, attached to the ceramic member 286, vibrates also. The air pressure within chamber 288 is increased slightly so that the diaphragm 290 moves away from the seal, as shown in FIG. 29, and does not inhibit the vibration of the probe 284. Gate B is switched off and Gate A connects the ceramic member 286 to the receiver 330. The decaying vibration produces a voltage that is proportional to the rate of decay. The voltage is integrated with respect to time in integrator and control 332 and a control signal results that triggers pulse generator 334 so as to keep the integrated voltage constant. This results in a pulse repetition rate that indicates whether the probe is in air, water or oil. The rate is counted in pulse counter 336. Air produces a low repetition rate, oil produces a high repetition rate as the damping characteristics of those liquids are such that the vibration of the probe is dampened more by the oil, resulting in more energy pulses and therefore a higher repetition rate. The apparatus may be simply calibrated by allowing the probe 284 to vibrate in air, water and oil, preferably oil in which the vessel is to be used. A range of values can thus be easily obtained and the information entered into computer 338. Due to its extremely high sensitivity the probe can detect minute physical changes within the same liquid as well as detecting the presence of different liquids. It is therefore invaluable in giving a precise detection of the point at which the interface is present.

The circuit of FIG. 30, designated Circuit A, is connected to the computer control programmed, designated program No 1, shown in FIGS. 32 and 33, to be discussed below.

FIG. 31 shows control of the ceramic piezoelectric transducer 268 for detecting the depth of the wedge 160 below the surface. The transducer 268 measures the time taken for sound waves to be reflected from an air/water or oil/water interface 340. The reflection time is directly proportioned to the depth of the wedge 160 upon which the transducer 268 is mounted. The signal is sent to a sending and receiving apparatus 342. The reflecting time 344 is measured and a signal is sent to a computer 346 designated computer program No 2 shown in FIG. 32.

FIG. 32 shows the control of the wedge under the signals generated from the sensors 268 and 270 both for detecting the depth of the wedge 160 and the means for ensuring that the wedge is at the proper position vis-a-vis the interface 340.

To use the circuit shown in FIG. 32, the repetition rate of the probe 284 is calibrated. Typical values that will be induced are as follows:
Air—0.1 kilohertz repetition rate;
Water—5 kilohertz repetition rate; and
Oil—15 kilohertz repetition rate.

These values are inserted into program No 1. To start the control process, switch 348 is turned on to start program No 1 and activate first electronic switch 350. The computer is connected to a power amplifier 352 to drive the motor 272 and deactivate a second electronic switch 354. The electronic switch 354 disconnects computer program No 2 from the power amplifier 352. The initiated program instructs the power amplifier 352 to rotate motor 272 to move the wedge 160 upward until a 100 hertz repetition rate (RR) is achieved. This indicates that the probe 284 is in air. A signal to stop and reverse direction of the probe is then sent. When a repetition rate of 15 kilohertz is received, indicating the probe is in oil, a pulse is sent to the interval timer 356.

When the repetition rate is 10 kilohertz, indicating the probe 270 is in water, motor 272 is stopped and a pulse simultaneously sent to the interval timer 356 which computes the length of the interval and correlates this to the oil thickness, sending a digital value to the oil thickness display 356. This value is sent to register No 1 of computer program No 2. A simultaneous pulse is sent to instruct motor 272 to move wedge up until a 15 kilohertz repetition rate (RR) is received, indicating that the probe 284 is in oil. The motor 272 is stopped and a pulse sent to turn switch 354 on and to switch 350 off. Simultaneously, a pulse is sent to computer program No 2 to compare the depth value received from the sensor 268. When the two readings are the same, the motor 272 is stopped. The wedge 160 is now under the control of program No 2.

When a 15 kilohertz pulse is absent from the program No 1, indicating the absence of oil, a pulse is sent to deactivate second switch 354 and activate first switch 350.

Pre-set control of the wedge depth below the surface may be controlled using keyboard 360 and manually turning the electronic switches 350 and 354 on. The computer then compares the present value in register R with the value received from the sensor.

This mode of operation may be desirable when none uniform conditions prevail such as a non-continuous oil sheet is found when the oil is in patches on the surface of the water. The first electronic switch 350 may then be manually switched off to prevent the wedge 160 from undue searching movements.

At the same time, excess deviation of the wedge is avoided by the use of the limit switches 304, 306 and 308. The necessary control circuit is shown in FIG. 33, which also shows, at least diagrammatically, the necessary structural features. When the wedge is in a position that the upper limit switch 308 is contacted a computer control program No 3 362 is activated to send a pulse to a motor 364 to operate pump 326 to pump fluid into a hydraulic cylinder 318 from reservoir 366, thus lowering the wall 154. When the wedge 160 is relatively horizontal, the middle limit switch 306 is operated to stop the pump 326. When the lower limit switch 304 is contacted, the computer control program signals the pump 326 to reverse, resulting in lowering of the walls until limit switch 306 is again operated.

Finally FIG. 34 shows control of the stabilizer 322. The transducer 320 on the bow of the vessel generate a series of pulses sent to pulse sending and receiving unit 368. The reflection time is calculated at 370 and a computer program 372 initiated that controls a power amplifier 374. The power amplifier 374 controls the valves 376 to a hydraulic pump 378 which pumps fluid to or from hydraulic cylinder 324. The hydraulic cylinder 324 is attached to the stern of the stabilizer 322 mounted to the vessel at 380. The stabilizer 322 is therefore pivoted upwardly or downwardly to adjust for the incoming wave and thus to stabilize or trim the vessel in its vertical movement.

In operation of the vessel according to FIG. 11 the oil collection is similar to that shown in describing the previous embodiments. The oil is concentrated both by the presence of the booms and by the vortex flow generated in the main bodies on the leading edges of the wedges. Oil is separated as shown with regard to the description of FIGS. 11 and 12.

The vessel is designed to minimise bow wave formation. Flow to the vessel is unimpeded creating a moving current through the vessel to increase the amount of surface oil in front of the wedge 160. The flow through is further accelerated by having the adjustable intake 246 for the motors 230 directly behind the wedge 160. Furthermore the shape of the wedge itself, with its narrow leading edge is a virtue in this regard. The wedge lifts the oil upwardly and the jets within the open face venturis also accelerate the oil.

All these features prevent bow wave formation, allowing oil to be removed efficiently.

The position of the vessel, and in particular, of the oil collecting equipment relative to the water level is constantly adjusted to provide an extremely fine detection of the correct position, of the wedge and adjustments are made to ensure that the wedge is always correctly positioned both with regard to the oil water interface and with regard to inclination of the wedge relative to the interface.

The vessel shown is thus able to collect oil with a sensitivity and ability unknown in the prior art.

I claim:

1. An apparatus to separate two immiscible liquids of different densities that form a two-phase mixture comprising an upper and a lower layer when together, the apparatus comprising:
   a main body for receiving the two liquids and having a base and an open top;
   an outlet adjacent to the base of the main body on a tangent to said base;
   a pump to pump the lower layer of the two phase mixture from the main body through the outlet;
   a jet generally adjacent to the center of the main body to direct the upper layer of the two phase mixture upwardly from the body;
   a means to supply liquid to the jet; and
   a float means to allow floating of the apparatus in a mixture of the two liquids;
   whereby the means to drive the lower layer from the outlet draws the two phase mixture into the body and the liquid from the jet forces the top layer of mixture upwardly, to separate the two liquids.

2. An apparatus as claimed in claim 1 that includes a concentrator for moving the upper layer comprising:
   a body having an inlet and an outlet, wherein the outlet is arched downwardly;
   a means to feed the liquid from the pump to the jet and to the concentrator inlet; and
   a means to proportion flow to the jet and to the concentrator.

3. An apparatus as claimed in claim 1 in which the jet is inclined at its top to direct the upper layer at an angle to the vertical.

4. An apparatus as claimed in claim 1 which includes:
   a venturi prior to the jet; and
   a reservoir connected to the venturi to receive a conditioning liquid, whereby the conditioning liquid is drawn into the liquid supplied to the jet by said pump.

5. An apparatus as claimed in claim 1 in which the main body is a generally truncated, inverted cone.

6. An apparatus as claimed in claim 1 which includes a plurality of main bodies, each with a jet.

7. An apparatus as claimed in claim 6 in which there is a common liquid supplied to the jets and a common liquid line to receive liquid from the main body outlets.

8. An apparatus as claimed in claim 7 which includes a venturi in communication with said common line to draw liquid into the line, and a water supply to said venturi to induce flow.

9. An apparatus as claimed in claim 6 which includes a steam supply to heat the liquid issuing from the jet to heat the upper layer.

10. An apparatus as claimed in claim 6 which includes a trough to receive the second layer forced upwardly from the jets.

11. An apparatus as claimed in claim 10 which includes a separator for the first and second liquids positioned to receive liquid from the trough.

12. An apparatus as claimed in claim 11 in which the separator has an outlet in the base to allow the lower liquid to drain, and baffles to assist in separating the liquids.

13. An apparatus as claimed in claim 11 which includes a jet in the separator having an outlet, and an air supply to the jet whereby the upper liquid in the separator is forced upwardly by an air jet to pass through venturi openings in a wall of the separator to fall into a collector from the separator for the lower liquids.

14. An apparatus as claimed in claim 13 which includes means to pass the liquid in the collector to storage.

15. An apparatus as claimed in claim 6 which includes a vessel having a platform;
   a means to mount the jets and main bodies suspended from the platform; and
   a means to vary the height of the main bodies and jets relative to the platform to control the location of the jets relative to the two liquids.

16. An apparatus as claimed in claim 16 in which each jet directs a liquid upwardly into a vacuum pipe to pass the liquid to storage; wherein the apparatus includes a means to adjust the height of the vacuum pipes and a means to adjust the height of the jets.

17. A vessel able to separate two immiscible liquids in which the vessel is floating, the two liquids being of different densities that form a two phase mixture when together with a first liquid on top and a second liquid below, the vessel comprising:
   a hull having twin floats to define a passage through the vessel;
   a separator at a leading edge of the hull to separate the first and second liquids and comprising at least one first upward jet adjacent the leading edge and at least one second upward jet aft of the first jet, wherein the first jet is located in a cavity having an open top;
   an outlet for the cavity arranged tangentially to the cavity and in communication with the source of suction whereby vortex flow can be induced in the cavity;
   a supply of liquid at above atmospheric pressure to said jets to remove an upper first liquid from the separator;
   a source of suction to remove the lower second liquid from the separator; and
   an intake manifold to receive the first liquid forced from the separator by the jets.

18. A vessel as claimed in claim 17 in which the separator is of triangular section with the leading edge being narrower than a trailing edge.

19. A vessel as claimed in claim 18 which includes means to control the angular position of the separator.

20. A vessel as claimed in claim 19 in which the means to control the position of the separator comprises:

a step motor;

a shaft pivotally mounted to the separator at the aft end of the separator;

a drive linking the motor and the shaft, whereby rotation of the motor rotates the shaft to change separator inclination.

21. A vessel as claimed in claim 20 which includes means to determine the depth of the leading edge of the separator.

22. A vessel as claimed in claim 21 in which the means to determine the depth of the separator comprises:

an ultrasonic transducer able to send and receive an ultrasonic signal;

a means to determine the depth of the leading edge of the separator from the time between signal transmission and signal receipt; and a means to activate the step motor to raise or lower the leading edge of the separator in the vessel in response to said signal.

23. A vessel as claimed in claim 22 in which the separator is mounted on walls movable relative to the hull of the vessel, wherein the vessel further comprises:

bearings to enable movement of the walls on tracks;

fluid cylinders to raise and lower the walls in response to a signal; and limit switches to detect pivoting of the leading edge of the separator greater than a predetermined amount and to generate said signal to raise or lower the walls and thus the separator upon detection of said pivoting greater than a predetermined amount.

24. A vessel as claimed in claim 19 which includes means on the separator to detect the interface between the first and second layer.

25. A vessel as claimed in claim 24 in which the means on the separator to detect the interface between the first and second layers comprises:

a probe;

a means to vibrate the probe; and a means to determine the degree of dampening necessary for the vibration and thus to determine the medium in which the probe vibrates.

26. A vessel as claimed in claim 25 in which the means to vibrate the probe comprises:

a chamber having a piezoelectric ceramic member in the chamber, wherein the probe is attached to the ceramic member and extends from the chamber;

a seal to seal the point at which the probe passes from the chamber; and electrical connectors to allow application of an alternating electric field across the ceramic to vibrate the ceramic and thus the probe.

27. A vessel as claimed in claim 26 which includes an air supply to the chamber to allow maintenance of the chamber at above ambient pressure, wherein the air supply also allows sufficiently increased pressure to move the seal from the probe to prevent damping of the probe by the seal.

28. A vessel as claimed in claim 24 in which the vessel further comprises:

an ultrasonic transducer located adjacent the bow wherein the transducer is able to transmit and receive a signal to determine wave height;

stabilizers at each side of the vessel; and fluid cylinders to pivot said stabilizers, wherein the fluid cylinders are adapted to receive said signal and to adjust the vessel depending on the incoming wave size.

29. A vessel as claimed in claim 17 in which the intake manifold is covered by a wire mesh conveyor belt through which oil passes but which collects debris.

30. A vessel as claimed in claim 29 in which the intake manifold is connected to a source of vacuum to draw liquid from the inlet manifold.

31. A vessel as claimed in claim 30 in which the source of vacuum passes liquid to a separator for the first and second liquids; wherein the separator has an outlet for the first and second liquids, and a jet to force the first liquid upwardly to a reservoir.

32. A vessel as claimed in claim 29 in which the conveyor belt is a driven endless belt, wherein the vessel further includes:

a compressed air jet to lift debris on the conveyor belt adjacent the end remote from the intake manifold;

a means to drive the lifted debris onwardly; and a second conveyor belt to receive lifted debris.

33. A vessel as claimed in claim 32 in which the means to drive the lifted debris comprises an impeller.

34. A vessel as claimed in claim 32 which includes means to remove oil adhering to the conveyor belt not lifted by the compressed air jet; and means to receive the removed oil.

35. A vessel as claimed in claim 17 having drive motors whereby the vessel may be self propelled.

36. A vessel as claimed in claim 17 in which the vessel has booms which widen outwardly at its bow to increase flowthrough of the liquid.

37. A vessel as claimed in claim 36 which includes means to reduce wave activity between the booms.

38. A vessel as claimed in claim 1 in which the means to reduce wave activity comprises surfaces suppressing upward and lateral movement of the waves and directing the waves to collide with each other to dissipate energy.

39. A vessel as claimed in claim 17 which includes storage means for a dispersant; and a means to mix the oil and dispersant where oil storage is not feasible.

* * * * *